(12) United States Patent
Fujihana et al.

(10) Patent No.: US 8,501,044 B2
(45) Date of Patent: Aug. 6, 2013

(54) ANTISTATIC COMPOSITION

(75) Inventors: Noriaki Fujihana, Ashiya (JP);
Yoshiharu Tatsukami, Toyonaka (JP);
Masaki Enomoto, Yokohama (JP); Ikuo Ohkoshi, Tokyo (JP)

(73) Assignees: Sanko Chemical Industry Co., Ltd., Osaka (JP); Riken Technos Corporation, Tokyo (JP)

( * ) Notice: Subject to any disclaimer, the term of this patent is extended or adjusted under 35 U.S.C. 154(b) by 1844 days.

(21) Appl. No.: 11/407,204

(22) Filed: Apr. 20, 2006

(65) Prior Publication Data
US 2006/0208232 A1    Sep. 21, 2006

Related U.S. Application Data

(63) Continuation-in-part of application No. 10/257,276, filed as application No. PCT/JP01/01578 on Mar. 1, 2001, now Pat. No. 7,192,538.

(30) Foreign Application Priority Data

| Apr. 12, 2000 | (JP) | 2000-111018 |
| Jul. 6, 2000 | (JP) | 2000-204539 |
| Jul. 6, 2000 | (JP) | 2000-204540 |
| Jul. 6, 2000 | (JP) | 2000-204541 |

(51) Int. Cl.
*H01B 1/12*     (2006.01)
*C08K 5/098*    (2006.01)

(52) U.S. Cl.
USPC ......... 252/500; 252/511; 252/519.3; 528/44; 528/48; 528/274; 524/167; 524/419; 524/296

(58) Field of Classification Search
USPC .. 524/436–439, 419, 167, 296–298; 252/511, 252/519.3, 500; 528/44, 48, 271–274, 278
See application file for complete search history.

(56) References Cited

U.S. PATENT DOCUMENTS

| 3,632,666 | A | | 1/1972 | Okazaki et al. |
| 4,200,701 | A | * | 4/1980 | Wetton et al. ................ 528/44 |
| 4,699,967 | A | * | 10/1987 | Eichenauer et al. .......... 528/29 |
| 4,806,571 | A | * | 2/1989 | Knobel et al. ............... 521/107 |
| 4,872,910 | A | | 10/1989 | Eshleman et al. |
| 5,574,101 | A | * | 11/1996 | Kawakami et al. ......... 525/92 A |
| 5,814,688 | A | | 9/1998 | Hilti et al. |
| 6,140,405 | A | * | 10/2000 | Eckstein et al. ............. 524/419 |

FOREIGN PATENT DOCUMENTS

| EP | 0 555 197 A2 | 8/1993 |
| EP | 0 602 241 A1 | 6/1994 |
| EP | 0 909 785 A2 | 4/1999 |
| FR | 1 574 845 A | 7/1969 |
| JP | 59-096142 A | 6/1984 |

(Continued)

*Primary Examiner* — Stanley Silverman
*Assistant Examiner* — Kallambella Vijayakumar
(74) *Attorney, Agent, or Firm* — Birch, Stewart, Kolasch & Birch, LLP

(57) ABSTRACT

An antistatic composition containing various types of polymers such as a polyamide, an aliphatic polyester, an elastomer thereof and a polyurethane elastomer, and a metal salt in specific amounts, and preferably, an antistatic composition in which an additive component such as an organic compound which has an —$\{O(AO)_n\}$— group (A represents an alkylene group having 2 to 4 carbon atoms, and n represents an integer of 1 to 7) and all molecular chain terminals of which are $CH_3$ and/or $CH_2$ groups is compounded as needed.

12 Claims, 1 Drawing Sheet

Advantage of the combination of components (J) and component (B)

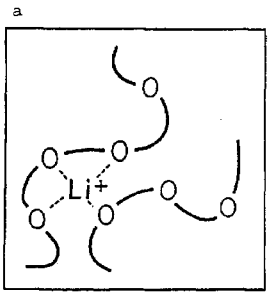

a

The lithium ions are dispersed uniformly in the composition.

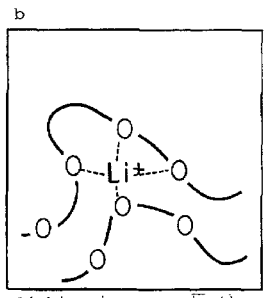

b

The lithium ions are in the state of ion transportation according to molecular movement of the ether oxygen moiety.

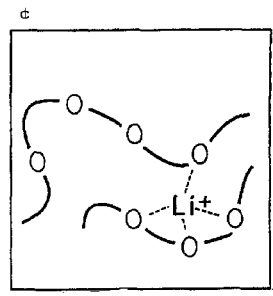

c

When electric field is charged from outside, lithium ions are transported to the corresponding pole (surface of the compound) and an ionic conduction mechanism is revealed.

FOREIGN PATENT DOCUMENTS

| | | | |
|---|---|---|---|
| JP | 64-009258 A | | 1/1989 |
| JP | 2-255852 A | | 10/1990 |
| JP | 2-284967 A | | 11/1990 |
| JP | 05-140541 | * | 6/1993 |
| JP | 5-140541 A | | 6/1993 |
| JP | 08-012755 | * | 1/1996 |
| JP | 8-12755 A | | 1/1996 |
| JP | 9-151310 A | | 6/1997 |
| JP | 9-227743 A | | 9/1997 |
| JP | 9-263690 A | | 10/1997 |
| JP | 10-182988 A | | 7/1998 |
| JP | 10-338779 A | | 12/1998 |
| JP | 11-039945 A | | 2/1999 |
| WO | WO-99/33918 A1 | | 7/1999 |

* cited by examiner

Advantage of the combination of components (J) and component (B)

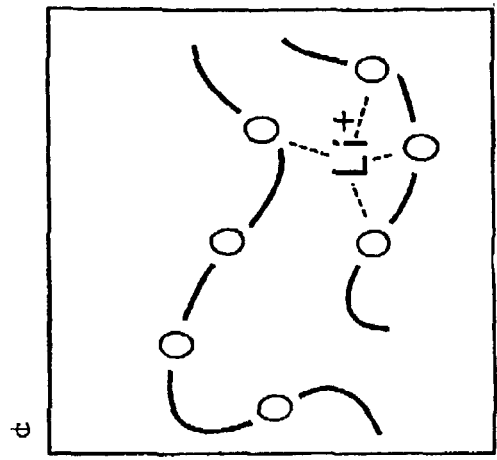

a

The lithium ions are dispersed uniformly in the composition.

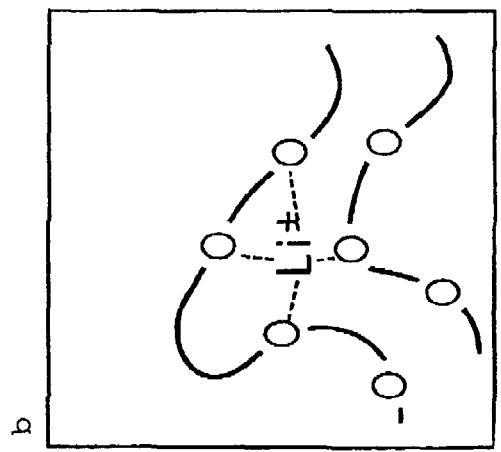

b

The lithium ions are in the state of ion transportion according to molecular movement of the ether oxygen moiety.

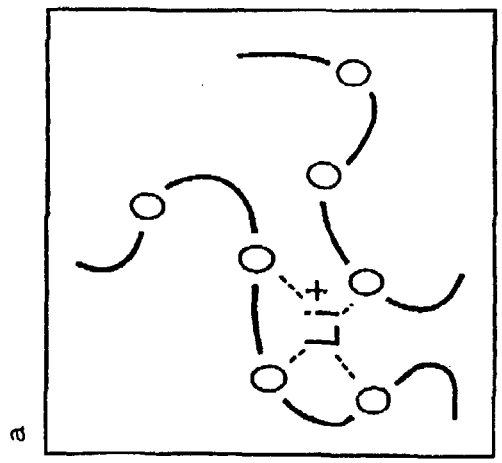

c

When electric field is charged from outside, lithium ions are transported to the corresponding pole (surface of the compound) and an ionic conduction mechanism is revealed.

ANTISTATIC COMPOSITION

This application is a continuation-in-part of application Ser. No. 10/259,276 filed Oct. 11, 2002, now U.S. Pat. No. 7,192,538, which is the national phase of PCT International Application No. PCT/PCT/JP2001/01578 filed on Mar. 1, 2001, which designated the United States and on which priority is claimed under 35 U.S.C. §120. This application claims priority under 35 U.S.C. 119 (a) to Patent Application Nos. 2000-111018; 2000-204539; 2000-204540 and 2000-204541, respectively, filed in Japan on Apr. 12, 2000; Jul. 6, 2000; Jul. 6, 2000 and Jul. 6, 2000, respectively. The entire contents of each of the above documents is hereby incorporated by reference.

TECHNICAL FIELD

This invention relates to an antistatic composition, and more particularly to an antistatic composition in which the bleeding-out is difficult to occur, and whose electric resistivity and formability are good. Further, the present invention relates to an antistatic composition which can be widely used in the field of melt-formable forming materials, and which is decomposable with microorganisms. The antistatic composition of the present invention is suitable for applications requiring high-degree antistatic treatment, including applications such as packaging and conveyance of electronic and electric parts.

The antistatic compositions have widely prevailed in the industrial world, and have been utilized in various applications. As the antistatic compositions, there are, for example, compositions in which resins and/or elastomers are highly filled with conductive fillers such as carbon black. Such compositions have been widely utilized mainly in the industrial field.

Further, electrostatic prevention type antistatic compositions in which electrostatic prevention type antistatic resins having surfactants or hydrophilic segments in their structure are polymer alloyed have also widely prevailed, and have been widely applied to various applications.

In recent years, antistatic polymer materials have prevailed in packaging of IC chips, and these materials have also been diversified from general-purpose plastics to engineering plastics. Further, measures for electrostatic prevention of precision instruments and relating instruments thereto have become increasingly important. As for the conductive fillers, carbon fiber, graphite, metal-coated fillers, metal fiber and the like as well as carbon black have been widely properly used depending on their purpose and function.

However, the conductive fillers have the inherent problem that the mechanical characteristics of polymers are deteriorated, or that forming is difficult.

In particular, into so-called thermoplastic elastomers having flexibility, the addition of the conductive fillers causes the problem that the flexibility (rubber elasticity), a material characteristic, is impaired. In some cases, the elastomers become very brittle by aging, which causes an extreme reduction in elongation to result in easy breakage.

Polyester elastomers have excellent characteristics such as high strength, wear resistance, oil resistance, chemical resistance and the like, and can be said to be representative of the thermoplastic elastomers. Although the polyester elastomers have flexibility, they generally have high hardness compared to the other elastomers, and have been widely used for applications from automobiles and home electric appliances including industrial members to convenience goods. In particular, they have been used mainly in applications requiring high hardness. As the conductive fillers added to the polyesterelastomers, carbon black has been generally used. However, there is the inherent problem that carbon black added is unevenly distributed in specified phases, thereby deactivating the rubber elasticity to become brittle as materials, or that the conductivity fluctuates depending on the treatment conditions. Further, the addition of carbon black has raised the problems of deteriorated conductive performance due to a reduction in wear resistance and poor design caused by color limitation to black.

As a method for obtaining antistatic properties using no conductive filler, there is a method of adding a so-called low-molecular type hydrophilic surfactant. Further, a modifying method according to a glycol-based polymer material and an ion such as a mixture of an alkylene glycol copolymer resin and an ionic electrolyte is disclosed in Japanese Patent Laid-Open Publication (Hei) 2-284967 and the like. However, the low-molecular type hydrophilic surfactant has problems with regard to persistency of the effect, heat resistance, bleeding-out, high resistivity and the like. Further, the mixture of the alkylene glycol copolymer resin and the ionic electrolyte has the problem that the bleeding-out easily occurs by concernment of temperature and moisture, because a terminal of the alkylene glycol copolymer resin has a hydroxyl group. Furthermore, the amount to be added is limited by the presence of a hard segment crystalline component of the polyester elastomer, so that there is the problem that the resistivity of the composition does not reach a sufficient level.

Further, thermoplastic polyurethane elastomers have excellent wear resistance and mechanical strength, and are widely applied. Conductive polyurethane elastomers containing conductive fillers also prevail. In recent years, with the spread of precision instruments, higher antistatic functions have been required, and the conventional antistatic level has become insufficient. The thermoplastic polyurethane elastomers compounded with the conductive fillers represented by carbon black are excellent in conductivity, but bring about a reduction in flexibility and processability. Besides, they have the problem of the dropout of the conductive materials due to a reduction in wear resistance and the problem of poor design caused by color limitation to black.

Further, as for antistatic compositions as materials for IC trays, which have hitherto been used for package of IC chips, weight saving, thinning and downsizing have come to be studied, and strength and high rigidity tend to be required. Furthermore, for the identification of the kind of IC and the like, it is also required that design such as coloring is given to trays and carrier tapes. Carbon black generally used in the conductive fillers is economical, and provides compositions having low resistivity. However, the color is limited to black, and generally, a problem arises with regard to processability, material strength and the like. Accordingly, carbon black has been usually used as composite materials compounded together with various modifying materials.

Antistatic agents include surface activity type ones giving the function by allowing them to bleed on surfaces, and ones allowing the function to be exhibited by polymer alloying hydrophilic polymer materials referred to as so-called polymerty peantist aticagents. In the polymer type antistatic agents, permanent antistatic performance is imparted to thermoplastic resins by polymer alloying with the hydrophilic polymers, and the industrial utility value thereof is high. However, it is required that the alloyed antistatic resins are added in relatively large amounts, and many antistatic resins are hydrophilic segments and have flexibility. Accordingly, the rigidity of the materials is lowered, and the deformation problem of formed articles arises. Although it has been tried to modify these resins by using them in combination with inorganic fillers, glass fiber or the like, flashing, weld marks, flash marks, shagginess and the like are developed on the surfaces of formed articles, resulting in insufficient surface smoothness. The hindrance to surface smoothness causes wide variations in surface resistivity value, or exerts effects on contact states of electronic and electric parts, thereby inhibiting the antistatic functions.

In these compositions, the surface resistivity value considered to be an antistatic level is usually up to $10^{10}$ to $10^{12}$ $\Omega$/sq.

In recent years, by an increase in performance and capacity of ICs, LSIs and the like, a characteristic of $10^{10}$ $\Omega$/sq. or less has come to be required as the electric characteristics required for the package application such as trays, and the so-called conventional antistatic region level has become insufficient. Ones constituted by carbon black has been overwhelmingly used. As for these, characteristics generally required are also strength and elastic modulus in bending, and inorganic fillers are generally added in relatively large amounts in order to meet the requirements (Japanese Patent Laid-Open Publication (Sho) 59-96142). However, mica, talc and the like widely used as the inorganic fillers are added in relatively large amounts, so that materials constituted by the conductive fillers have the problem that variations in conductivity become wide, as well as the problem that deterioration of processability and impact-resistant strength and the like are promoted.

On the other hand, in order to prevent deterioration of these strength characteristics, chopped fibers such as glass fiber, carbon fiber and the like are used in combination in some cases. Although these chopped fibers are effective for imparting rigidity and strength, the surface smoothness of formed articles such as flashing, weld marks, flash marks, shagginess and the like is not satisfied. Further, with deterioration of the surface state of the formed articles, the contact with instruments becomes insufficient, which hinders leakage of charges.

In recent years, it has become important to impart antistatic properties to rubber, and in order to achieve this, there is known a method of coating a surface of a formed article with an antistatic agent such as a surfactant, or a method of kneading an antistatic agent therein. However, in the former method, the antistatic properties are significantly deteriorated with the elapse of a long period of time, so that it is difficult to put to practical use as highly antistatic rubber having persistency. On the other hand, in the later method, there is the problem that the antistatic agent bleeds out on the surface of the formed article, or the problem that the antistatic effect is reduced, because of poor compatibility of the antistatic agent with the rubber.

Further, a method of kneading carbon black, carbon fiber or the like in rubber has also been proposed. According to this method, the above-mentioned problem can be solved, because of persistency of the antistatic properties and electrostatic prevention. However, the problem that the rubber hardness becomes high to impair flexibility is encountered, in addition to the new problem that coloration can not be freely conducted.

Here, as a problem for solving dispersibility and compatibility of these problems of the antistatic rubber composition, there is proposed a method of compounding an antistatic plasticizer and rubber. This is a method in which the antistatic properties are given to the plasticizer for chlorine-containing resin, which is a component indispensable to various kinds of processes. For example, a vinyl chloride composition containing an antistatic plasticizer comprising lithium perchlorate is illustrated, in Japanese Patent Laid-Open Publication (Sho) 64-9258 and Japanese Patent Laid-Open Publication (Hei) 2-255852.

However, the addition of a perchlorate such as lithium perchlorate arises the problem that the heat stability of a vinyl chloride-based resin is impaired. Further, the addition thereof to chlorine-containing rubber such as chloroprene rubber arises the problem that the heat stability is impaired.

Further, Japanese Patent Laid-Open Publication (Hei) 9-227743 proposes a method of adding a plasticizer and lithium bis(trifluoromethanesulfonyl)imide to a vinyl chloride-based resin, thereby providing a transparent conductive composition. This composition is a transparent conductive composition, so that it can be easily colored. However, this composition has the problem that it turns burned umber on heating at 120° C. for 90 minutes to lose the transparency and the conductivity, because of its poor heat resistance. Further, this composition has the problem that the plasticizer bleeds out.

The synthetic resins synthesized from petroleum starting materials are represented by polyethylene, polypropylene, polystyrene, polyvinyl chloride, polyesters, polyamides and the like, and have been widely used from essential commodities of life to industrial products. The convenience and economical efficiency of these synthetic resins come to largely support our life, and the synthetic resins have surely become the basis of the petrochemical industry.

Therefore, the amount of production of the synthetic resins domestically produced amounts to about 15,000,000 tons per year, and they are discarded in prodigious quantities amounting to about one third thereof. Accordingly, waste disposal by burning and reclamation had already reached the critical limit. In recent years, movements such as resource recovery, recycling and the like have been intensified, and the synthetic resins are newly added in the Containers and Packaging Recycling Law enforced from 2000. It is therefore predicted that strong and effective recovery and reusing of the synthetic resins are required. However, in view of the synthetic resins produced in prodigious quantities every year, situations where recycling is difficult, such as the use in applications where recovery is difficult, are left.

Further, synthetic resin products scattered in the natural environment has become significant from year to year, which cause serious social problems such as an increase in necessity of wildlife protection and destruction of living environments.

Such problems over the environment have attracted more attention from year to year, and the central government including the Ministry for the Environment and respective local governments have been driven by the necessity for seriously taking measures to meet the situation.

In the synthetic resin market, movements to demands for decomposability of the resins in the natural environment have been intensified, and biodegradable resins have been developed which are decomposed and made to resource in the course of time even when thrown away outdoors. On the other hand, from measures against toxic gases generated in burning the synthetic resins, synthetic materials nearer to natural materials have been desired, and also as part of the burning measures, demands for the biodegradable resins have risen.

The biodegradable resins are resins degradable with microorganisms in the soil, seawater, rivers and lakes, and expansion to applications in which recycling of synthetic resin wastes is inefficient and economically poor has been rapidly spread. Also as for measures against scattered trash, the value of the biodegradable resins has been increasingly recognized, and it is expected that the utilization thereof is hereafter further widened.

At present, construction of commercial composts proceeds in various locations. On the other hand, the sale of composts for domestic use toward individual consumers also starts. Thus, expansion of the biodegradable resins has been expected in various locations. Also in the Ministry of Economy, Trade and Industry, the practical application investigative committee has started, and movements toward the promotion of the biodegradable resins have been intensified. Further, viewing worldwide, a massive market is predicted to appear in which a considerable part of demands for the synthetic resins on the scale of an annual production of 100,000,000 tons is occupied by the biodegradable resins. In the 21st century, serious expansion of the biodegradable resin market is surely predicted.

As biodegradable materials and environmentally low load type materials which are in practical use at present, there are known aliphatic polyesters, modified starch, polylactic acid, various composite materials in which these resins are used as matrixes, polymer alloys and the like. Of these, the aliphatic polyester resins have high biodegradability, and has been widely studied as packaging materials.

On the other hand, packaging materials subjected to so-called antistatic treatment are required for packaging electronic and electric materials. In recent years, however, materials more excellent in antistatic ability have been required in order to increase the capacity of semiconductors and to prevent electrostatic destruction of precision instruments.

Measures to electrostatic charges have hitherto been conducted by compelxing according to the addition of surfactants or persistent polymer type surfactants. However, many of the packaging materials made of synthetic resins, which have been subjected to so-called antistatic treatment, become discarded wastes after the packaging and conveying functions have been performed. Although the Containers and Packaging Recycling Law has prevailed and recycle systems have been enforced in recent years, many of the packaging materials are still difficult to be recovered, and disposed by way of such as burning and reclamation. In such a situation, ecologically concerned materials have come to be necessary also for packaging materials requiring high antistatic functions, and measures have been studied by various techniques.

Many of the biodegradable resins are hydrophilic ones, which include, for example, cellulose acetate, poly-caprolactone, polyvinyl alcohol and the like, and functionally have antistatic characteristics. However, the antistatic properties depend on the environmental humidity, so that the variation in antistatic performance becomes wide. Further, there is also proposed a method of adding conductive fillers such as carbon black and the like, thereby imparting and stabilizing antistatic performance. However, the use of the conductive fillers limits color tones to black, so that there is the problem that the use as packaging materials make it difficult to identify internal products, or that forming processing is difficult to allow the resistivity to fluctuate according to the forming situation.

Further, there is also reported the case that the addition of carbon black to a biodegradable resin generally reduces the biodegradable function.

Cases of static prevention using the biodegradable materials are disclosed in Japanese Patent Laid-Open Publication (Hei) 9-263690, Japanese Patent Laid-Open Publication (Hei) 11-039945 and the like. However, in such static prevention, there are problems that it is necessary to mix the conductive fillers in relatively large amounts, so that the material themselves are apt to become hard and brittle, that the color tones of the products are limited to black, so that identification of the inside is impossible when the products are used as packaging materials, and that the antistatic properties are lost according to forming conditions, particularly, physical functions in stretching processing.

Further, when the surfactants are added to the biodegradable resin materials, thereby imparting the antistatic properties, problems are encountered with regard to persistency of the effect, wide variations in time showing the effect, durability such as environmental humidity dependency and the environment used.

In the meantime, polyamide resins are excellent in wear resistance, chemical resistance and heat resistance, and have been widely used. However, the developments of polyamide compositions high in electric insulation and excellent in conductivity have been expected.

Further, polyamide elastomers have excellent wear resistance and mechanical strength, and are widely applied. Conductive polyamide elastomers containing conductive fillers also widely prevail. In recent years, with the spread of precision instruments, higher antistatic functions have been required, and the conventional antistatic level has become insufficient. The thermoplastic polyamide resins and the thermoplastic polyurethane elastomers compounded with the conductive fillers represented by carbon black are excellent in conductivity, but bring about a reduction in flexibility and processability. Besides, they have the problem of the dropout of the conductive materials due to a reduction in wear resistance and the problem of poor design caused by color limitation to black.

On the other hand, one in which the so-called hydrophilic surfactant is used as a conductive material, the mixture of the alkylene glycol copolymer resin family and the ionic electrolyte (Japanese Patent Laid-Open Publication (Hei) 2-284967) and the like are proposed. However, the bleeding-out easily occurs according to the temperature and moisture, because the terminal of the copolymer has a hydroxyl group, and problems arise with regard to surface stains and persistency of the effect.

The present invention has been made against the background of such conventional technical problems, and an object thereof is to obtain an antistatic composition in which the bleeding-out of an electric conductive substance is little, and whose antistatic property and formability are good.

DISCLOSURE OF THE INVENTION

First, the present invention relates to an antistatic composition (hereinafter also referred to as a "first composition"), wherein the composition contains 0.001~3.0 parts by weight of (B) at least one lithium salt selected from the group consisting of lithium trifluoromethanesulfonate, lithium bis(trifluoromethanesulfonyl)imide and lithium tris(trifluoromethanesulfonyl)methide, based on 100 parts by weight of (J) polyether segment-containing antistatic elastomers.

Here, it is preferred that the above-mentioned first composition further contains (C) an organic compound which has an —{O(AO)$_n$}— group (A represents an alkylene group having 2 to 4 carbon atoms, and n represents an integer of 1 to 7) and all molecular chain terminals of which are CH$_3$ and/or CH$_2$ groups (hereinafter also referred to as a "1-1 composition")

Additionally, it is preferred that the above-mentioned first composition further contains above-mentioned components (C) and (K) a scale-like inorganic filler and/or a fibrous inorganic filler (hereinafter also referred to as a "1-2 composition").

Further, it is preferred that the above-mentioned first composition further contains above-mentioned component (K) (hereinafter also referred to as a "1-3 composition").

Second, the present invention relates to an antistatic composition (hereinafter also referred to as a "second composition") wherein the composition contains 0.003~12.5 parts by weight of (B) at least one lithium salt selected from the group consisting of lithium trifluoromethanesulfonate, lithium bis (trifluoromethanesulfonyl)imide and lithium tris(trifluoromethanesulfonyl)methide, based on 100 parts by weight of (A) a thermoplastic resin and (J) polyether segment-containing antistatic elastomers.

Here, it is preferred that the above-mentioned second composition further contains (C) an organic compound which has an —{O(AO)$_n$}— group (A represents an alkylene group having 2 to 4 carbon atoms, and n represents an integer of 1 to 7) and all molecular chain terminals of which are CH$_3$ and/or CH$_2$ groups (hereinafter also referred to as a "2-1 composition").

Additionally, it is preferred that the above-mentioned second composition further contains above-mentioned components (C) and (K) a scale-like inorganic filler and/or a fibrous inorganic filler (hereinafter also referred to as a "2-2 composition").

Further, it is preferred that the above-mentioned second composition further contains above-mentioned component (K) (hereinafter also referred to as a "2-3 composition").

Third, the present invention relates to an antistatic composition (hereinafter also referred to as a "third composition") wherein the composition contains 0.001~3.0 parts by weight of (B) at least one lithium salt selected from the group consisting of lithium trifluoromethanesulfonate, lithium bis(trifluoromethanesulfonyl)imide and lithium tris(trifluoromethanesulfonyl)methide, based on 100 parts by weight of (L) at least one polymer selected from the group consisting of natural rubber, styrene-butadiene rubber (SBR), isoprene rubber, ethylene-propylene rubber, an ethylene-propylene-diene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber and (J) polyether segment-containing antistatic elastomers.

Here, it is preferred that the above-mentioned third composition further contains (C) an organic compound which has an —{O(AO)$_n$}— group (A represents an alkylene group having 2 to 4 carbon atoms, and n represents an integer of 1 to 7) and all molecular chain terminals of which are CH3 and/or CH$_2$ groups (hereinafter also referred to as a "3-1 composition").

Additionally, it is preferred that the above-mentioned third composition further contains above-mentioned components (C) and (K) a scale-like inorganic filler and/or a fibrous inorganic filler (hereinafter also referred to as a "3-2 composition").

Further, it is preferred that the above-mentioned third composition further contains above-mentioned component (K) (hereinafter also referred to as a "3-3 composition").

Here, in each composition described above, the above-mentioned component (J) may be at least one selected from the group consisting of a polyamide elastomer, a polyester elastomer and a polyurethane elastomer.

And, it is preferred that the above-mentioned component (J) is a polyetheresteramide resin.

Further, the above-mentioned polyetheresteramide resin is preferably one derived from an alkylene oxide addition product of a polyamide having carboxyl groups at both terminals and a bisphenol, and/or from a polyoxyalkylene glycol.

Further, in each composition described above, the above-mentioned component (C) is preferably bis[2-(2-butoxyethoxy)ethyl] adipate or bis(2-buthoxyethyl)phthalate.

Further, in each composition described above, the above-mentioned component (K) is preferably at least one selected from the group consisting of calcium silicate fiber, mica and talc.

Further, the above-mentioned component (A) is preferably at least one selected from the group consisting of polystyrenic resins, polyamide and aliphatic polyesters.

Furthermore, the above-mentioned component (J) is contained in an amount of 25 to 3 parts by weight based on 75 to 97 parts by weight of the above-mentioned component (A) or (L) (provided (A) or (L)+(J)=100 parts by weight).

Here, the ratio of the above-mentioned component (C) to 100 parts by weight of the above-mentioned component (J) is preferably from 0.1 to 20 parts by weight.

Further, the ratio of the above-mentioned component (C) to 100 parts by weight of the above-mentioned component (A) or (L) and (J) is preferably from 0.1 to 20 parts by weight.

Furthermore, in each composition described above, the ratio of the above-mentioned component (B) to the total amount of the above-mentioned component (B) and component (C) is preferably from 0.1 to 50 % by weight.

Further, it is preferred to use the component (B) previously dissolved in the component (C).

Each composition described above may be a pelletized composition obtained by melt kneading constituent components.

Further, each composition described above may be a directly formable composition obtained by dry blending constituent components.

Furthermore, the composition of the present invention may be one obtained by using as a master batch a pelletized compound obtained by melt kneading parts of the above-mentioned various polymers, components (B) and (J), and component (C) and (K) as needed, and mixing it with the remainders of the polymer components and the like.

Furthermore, the composition of the present invention may be one obtained by using as a master batch a pelletized compound obtained by melt kneading parts of the above-mentioned various polymers, components (A), (B) and (J), and component (C) and (K) as needed, and mixing it with the remainders of the polymer components and the like.

Furthermore, the composition of the present invention may be one obtained by using as a master batch a pelletized compound obtained by melt kneading parts of the above-mentioned various polymers, components (L), (B) and (J), and component (C) and (K) as needed, and mixing it with the remainders of the polymer components and the like.

The compositions of the present invention are described below in the order of the first to 3-3 compositions. However, for the components already described in each composition, descriptions thereof are omitted.

BRIEF DESCRIPTION OF THE DRAWINGS

FIG. 1 graphically depicts an advantage of the combination of components (J) and (B).

BEST MODE FOR CARRYING OUT THE INVENTION

First Composition

The first composition is the antistatic composition, wherein the composition contains 0.001~3.0 parts by weight of (B) at least one lithium salt selected from the group consisting of lithium trifluoromethanesulfonate, lithium bis(trifluoromethanesulfonyl)imide and lithium tris (trifluororomethanesulfonyl)methide based on 100 parts by weight of (J) polyether segment-containing antistatic elastomers.

The component (B) used in the present invention is at least one lithium salt selected from the group consisting of lithium trifluoromethanesulfonate ($CF_3SO_3Li$), lithium bis(trifluoromethanesulfonyl)imide (($CF_3SO_2$)$_2NLi$) and lithium tris(trifluoromethanesulfonyl)methide ($CF_3SO_2$)$_3CLi$) (hereinafter also referred to as a "metal salt").

The addition of these metal salts in small amounts reduces the resistivity, resulting in further exhibition of the above-mentioned antistatic effect.

The composition of the present invention (the first composition to the 3-3 composition) contains at least one of these metal salts.

Then, (J) polyether segment-containing antistatic elastomers of the present invention has the function as "Electrostatic discharge polymers (ESD Polymers)" or "Inherently dissipative polymers". Component (J) is polymer compound which is incorporated electrically conductive unit in there molecule.

(J) polyether segment-containing antistatic elastomers include a polyamide elastomer, a polyester elastomer, a polyurethane elastomer and the like. The above-mentioned elastomer is preferably one having a soft segment and a hard segment. The soft segment achieves the effect that an elastomer molecular chain moves easily resulting in the lower glass transition temperature (Tg) of the elastomer. Examples thereof include a polyether segment and a polyester segment. The hard segment restrains the partial molecular movement, and can be a physical crosslinking point. The combination of these segments achieves the effect of providing a thermoplastic elastomer excellent in rubber elasticity and maintaining mechanical characteristics of the elastomer. Examples thereof include polyester, polyamide and polyurethane elastomers and the like.

The polyamide elastomer used as component (J) of the present invention is the general term for thermoplastic elastomers each having a polyamide restricting phase which is a hard segment and a polyether or polyester structure as a soft segment. For example, a polyamide elastomer in which a PA 12 component is used as the polyamide (PA) restricting phase is obtained by a method of reacting lauroyl lactam, a dicarboxylic acid and a polyetherdiol under pressure and heating by addition of a lactam ring-opening catalyst to obtain a carboxyl telechelic nylon 12 oligomer, and then a thermoplastic elastomer by condensation reaction with the polyetherdiol. In addition to this, PA 6 or the like can be used as the polyamide restricting phase.

The above-mentioned synthesis method provides the polyamide elastomer having the basic structure of a polyether block polyamide elastomer or a polyetherester block polyamide elastomer. Here, the polyamide elastomer having various characteristics is obtained according to the kind of diol used in the above-mentioned synthesis method, and the like.

The polyamide elastomers are high in high-temperature characteristics and excellent in mechanical characteristics, oil resistance, low-temperature characteristics and the like, so that they have been widely used for sports goods and the like, as well as for machine parts, automotive parts and the like.

The polyester elastomer used as component (J) of the present invention is a multi-block copolymer using a polyester as a hard segment in a molecule, and a polyether or a polyester having a low glass transition temperature (Tg) as a soft segment. The polyester elastomer include a polyester/polyether type using an aromatic crystalline polyester such as polybutylene terephthalate or the like as a hard segment, and a polyether as a soft segment, a polyester/polyester type using an aromatic crystalline polyester as a hard segment, and an aliphatic polyester as a soft segment, and the like.

The polyester/polyether type is, for example, one synthesized by the ester exchange reaction and the polycondensation reaction, using dimethyl terephthalate, 1,4-butanediol, polytetramethylene ether glycol and the like as starting materials. Further, the polyester/polyether type can also be synthesized by the ester exchange reaction and the ring opening reaction, using dimethyl terephthalate, 1,4-butanediol, ε-caprolactone and the like as starting materials.

The polyurethane elastomer used as component (J) of the present invention is an urethane group-containing thermoplastic elastomer, and a straight chain multi-block copolymer of a polyurethane as a soft segment which is obtained by the reaction of a long-chain glycol with an isocyanate and a polyurethane as a hard segment which is composed of a short-chain glycol and an isocyanate. A crosslinking agent (chain extender) is also used as needed.

Here, according to the general classification of the long-chain glycols based on the kind, polyether-based glycols include polyethylene oxide, polypropylene oxide and a copolymer thereof, polyester-based glycols include a polyadipate, a polylactone and a polycarbonate, and aliphatic glycols include polybutadiene, polyisoprene and the like.

Further, as the short-chain glycol, there is generally used an aliphatic glycol such as ethylene glycol, 1,4-butanediol or 1,6-hexanediol, an alicyclic glycol such as cyclohexanedimethanol, and an aromatic glycol such as hydroquinonebis(2-hydroxyethyl)ether.

On the other hand, as the above-mentioned isocyanate, there is used 4,4'-diphenylmethane diisocyanate (MDI), 2,4' & 2,6-toluene diisocyanate (TDI) or the like.

Further, as the above-mentioned crosslinking agent (chain extender), there is used an aromatic diamine such as 3,3-dichloro-4,4-diaminophenylmethane (MBOCA).

In addition, an aliphatic polyester resin having a low glass transition temperature and the like are available as component (J).

Among the polyester elastomers, the polyetheresteramide is particularly preferred as component (J). In general, a polyether type nonionic surfactant has hydrophilicity by virtue of hydrogen bonding of an oxygen atom of an ether bond in a polyether chain with a hydrogen atom of a water molecule.

The above-mentioned polyetheresteramide is one type of such polyether segment-containing high molecular nonionic surfactants. Specific examples of the polyetheresteramides include a polyethylene glycol-polyamide copolymer, a polyethylene glycol-methacrylate copolymer, a polyethylene oxide/polypropylene oxide copolymer, a polyethylene glycol-based polyesteramide copolymer, a polyethylene glycol-based polyester elastomer and the like, which are polyether segment-containing antistatic elastomers. The antistatic elastomer is preferably a polyetheresteramide resin derived from an alkylene oxide addition product of a polyamide having carboxyl groups at both terminals and a bisphenol, and/or from a polyoxyalkylene glycol.

The polyetheresteramide may previously optionally contain at least one of the above-mentioned component (B).

Further, each of these elastomers may previously optionally contain at least one of component (B).

These elastomers have hydrophilic segments such as polyethers in their structure, and the elastomers themselves have the antistatic function, so that the antistatic function can be imparted by polymer alloying the elastomers with thermoplastic resins. However, the surface resistivity value obtained is up to a level of $10^{11}$ to $10^{12}$ Ω/sq., and can not be reduced to $10^{10}$ Ω/sq. or less.

These elastomers can also be used together with other polymers in the polymer alloy or polymer blend form.

The glass transition temperature (Tg) of component (J) of the present invention is preferably 50° C. or less, more preferably 40° C. or less, and particularly preferably 30° C. or less. When it exceeds 50° C., it is difficult to exhibit the antistatic function in the ordinary use environment.

The amount of component (B) compounded is from 0.001 to 3.0 parts by weight, and preferably from 0.05 to 2.0 parts by weight, based on 100 parts by weight of component (J). Less than 0.001 part by weight results in failure to obtain sufficient antistatic properties, whereas even exceeding 3.0 parts by weight results in no improvement in the antistatic effect, and conversely causes the progress of crystallization, deterioration of materials and the like to lower the antistatic effect. As a compounding method of metal salt (B) to component (J), it is possible to directly mix metal salt (B) with the resin by melt mixing or dry blend mixing, when the content of metal salt (B) is as small as 0.01 to 2.5 parts by weight. However, when the content of metal salt (B) is increased, the variation in the dispersibility in the resin sometimes becomes wide. It is therefore desirable to use the metal salt previously dissolved in the compound (C) mentioned below or the like.

1-1 Composition 1-1 Composition of the present invention is the antistatic composition that the above-mentioned first composition further contains (C) an organic compound which has an —{O(AO)$_n$}— group (A represents an alkylene group having 2 to 4 carbon atoms, and n represents an integer of 1 to 7) and all molecular chain terminals of which are CH$_3$ and/or CH$_2$ groups.

Component (C) of the present invention is an organic compound which has an —{O(AO)$_n$}— group (A represents an alkylene group having 2 to 4 carbon atoms, and n represents an integer of 1 to 7) and all molecular chain terminals of which are CH$_3$ and/or CH$_2$ groups. The above-mentioned CH$_2$ groups at the molecular chain terminals have carbon atoms linked by double bonds.

The molecular chain terminals of the component (C) of the present invention are blocked by CH$_3$ and/or CH$_2$ groups. Therefore, the component (C) can ionize lithium (above-mentioned component (B)) selectively. The bleeding out doesn't happen easily when the component (C) is used because the component (C) has the above-mentioned structure.

The above-mentioned component (C) has the effect on improvements in solubility and dissociation stability of the metal salt in the composition of the present invention.

Component (C) used in the present invention can be produced by a common method for producing an ester compound, for example, using an alcohol obtained by adding 1 to 7 moles of an alkylene oxide having 2 to 4 carbon atoms to 1 mole of a branched aliphatic alcohol and a dibasic acid as starting materials.

Here, examples of the above-mentioned alcohols include hydroxyl group-containing compounds obtained by adding 1 to 7 moles of ethylene oxide, 1 to 4 moles of propylene oxide or 1 to 3 moles of butylene oxide to 1 mole of propanol, 1 to 6 moles of ethylene oxide or 1 to 3 moles of propylene oxide to butanol, 1 to 2 moles of ethylene oxide to hexanol, 1 to 5 moles of ethylene oxide, 1 to 3 moles of propylene oxide or 1 to 2 moles of butylene oxide to pentanol, 1 to 5 moles of ethylene oxide, 1 to 3 moles of propylene oxide or 1 to 3moles of butyleneoxidetooctanol, and 1 to 4 moles of ethylene oxide, 1 to 2moles of propylene oxide or to 2 moles of butylene oxide to nonanol, respectively.

Of these compounds, 2-(2-butoxyethoxy) ethanol obtained by adding 2 moles of ethylene oxide to 1 mole of butanol, and 2-butoxyethanol obtained by 1 mole of ethylene oxide to 1 mole of butanol are good in a balance with processability.

Further, the above-mentioned dibasic acids include carboxylic acids such as adipic acid, sebacic acid, phthalic acid and succinic acid, carboxylic acid anhydrides thereof and the like.

Component (C) produced using the above-mentioned starting materials is preferably a compound whose terminals are alkyl groups having no hydroxyl groups. Particularly preferred is dibutoxyethoxyethyl adipate (bis[2-(2-butoxyethoxy)ethyl]adipate) shown in the following chemical formula (1), or bis(2-butoxyethyl)phthalate shown in the following chemical formula (2):

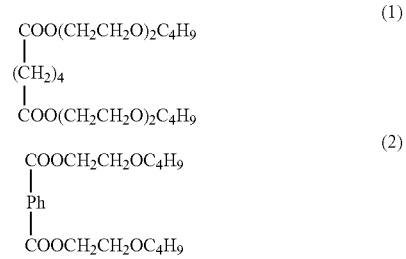

When component (C) is contained in the composition, the amount of component (C) added is preferably from 0.1 to 20 parts by weight, and more preferably from 0.3 to 8 parts by weight, based on 100 parts by weight of component (J). Less than 0.1 part by weight results in the difficulty of obtaining sufficient conductivity, whereas exceeding 20 parts by weight results in a significant reduction in viscosity of the resulting composition, which causes deterioration of physical characteristics, as well as a reduction in forming processability such as draw down properties and deterioration of dimensional stability of a formed article.

In preparing the 1-1 composition, methods for adding the respective components and the order thereof can be suitably selected. However, following 4 methods are preferably used;
(1) Method of adding the component (C) in which component (B) was previously dissolved in the component (J).
(2) Method of adding component (C) to the component (J) in which component (B) was previously added.
(3) Method of adding component (B) to the component (J) in which component (C) was previously added.
(4) Method of adding component (C) and (B) at the same time to the component (J).

In 1-1 composition, the compounding amount of component (B) is the same as above-mentioned the first composition.

1-2 Composition 1-2 Composition of the present invention is the antistatic composition that the above-mentioned first composition further contains above-mentioned components (C) and (K) a scale-like inorganic filler and/or a fibrous inorganic filler.

Component (K) used in the present invention is a scale-like inorganic filler and/or a fibrous inorganic filler, preferably at least one selected from the group consisting of calcium silicate fiber, mica and talc, and more preferably calcium silicate fiber. The calcium silicate fiber is a compound represented by CaSiO$_3$, and produced from a calcareous starting material and a siliceous starting material. This is a compound having as a basic skeleton a single chain structure in which tetrahedrons are linked in a unitary direction, in its crystal structure. As for the size of the fiber, the average fiber diameter is from 1 to 10 µm, and the average fiber length is from 8 to 70 µm, preferably from 10 to 70 µm, and more preferably from 20 to 50 µm. When the average fiber length is less than 8 µm, the sufficient physical reinforcement effect and dimensional stability are not obtained. On the other hand, when the average fiber length exceeds 70 µm, problems such as deteriorated appearance of a formed article, warping and deformation arise. One is also available to which surface treatment such as titanate coupling or silane coupling is applied in order to enhance the compatibility with components (B), (C) and (J).

The ratio of component (K) contained in the 1-2 composition is from 3 to 80 parts by weight, and preferably from 5 to 60 parts by weight, based on 100 parts by weight of the total of components (B), (C) and (J). When the ratio of component (K) contained is less than 3 parts by weight, the dimensional stability is poor, resulting in unsuitability for a precision formed article. On the other hand, exceeding 80 parts by weight results in deteriorated formability, smoothness of a surface of a formed article and strength.

In preparing the 1-2 composition, methods for adding the respective components and the order thereof can be suitably selected. However, preferably, melt mixing of inorganic filler (K), preferably calcium silicate fiber, after (B), (C) and component (J) have come into a molten state, reduces fiber breakage to prevent the material strength from falling.

In 1-2 composition, the compounding amount of components (B) and (C) is the same as above-mentioned first and 1-1 composition.

1-3 Composition 1-3 Composition of the present invention is the antistatic composition that the above-mentioned first composition further contains component (K).

In preparing the 1-3 composition, methods for adding the respective components and the order thereof can be suitably selected. However, preferably, melt mixing of inorganic filler (K), preferably calcium silicate fiber, after components (B) and (J) have come into a molten state, reduces fiber breakage to prevent the material strength from falling.

In 1-3 composition, the compounding amount of components (B), (J) and (K) is the same as above-mentioned first, 1-1 and 1-2 compositions.

Second Composition

The second composition is the antistatic composition, wherein the composition contains 0.003~12.5 parts by weight of (B) at least one lithium salt selected from the group consisting of lithium trifluoromethanesulfonate, lithium bis(trifluoromethanesulfonyl)imide and lithium tris(trifluoromethanesulfonyl)methide, based on 100 parts by weight of (A) a thermoplastic resin and (J) polyether segment-containing antistatic elastomers.

Thermoplastic resin (A) used in the composition of the present invention may be any as long as it is a thermoplastic resin. Examples thereof include vinyl monomer polymers or copolymers such as, polystyrenic resin such as polystyrene, rubber-modified polystyrene (an impact resistant polystyrene), styrene-α-methylstyrene copolymer, styreneparamethyl-styrene copolymer, styrene-acrylicacid rubber-acrylonitrile copolymer, styrene-maleic anhydride copolymer and acrylonitrile-butadiene-styrene copolymer (ABS resin), and acrylate/methacrylate-based resin; polyα-olefins such as low density polyethylene, intermediate density polyethylene, high density polyethylene, low-pressure-processed low density polyethylene, straight chain-like low density polyethylene, polypropylene, polybutene-1 and poly(4-methylpentene-1)1; (co)polymers of α-olefins or α-olefins with other monomers such as a propylene-ethylene block copolymer and a propylene-ethylene random copolymer; other polyolefinic resins; polyamides such as polyamide, polyamidepolyester copolymer, polyamidepolyether copolymer; aromatic polyesters such as polyethylene terephthalate (PET), polybutylene terephthalate (PBT), polyethylene naphthalate (PEN), amorphous polyethylene terephthalate-based (PETG), polycyclohexylenedimethylene terephthalate (PCT), copolymer of PET and PCT (PCTG), isophthalic acid modified polyester-based copolymer(copolymer of PCT and polycyclohexanedimethyleneisophthalate; PCTA), and aliphatic polyesters, liquid crystal polyesters; aromatic polyethers such as polyphenylene oxide; polyacetal-based resins such as homopolymer and copolymer of formaldehyde(Derlin, Duracon and Celconas commercial items); polycarbonate-based resins; sulfone-based polymers such as a polysulfone and a polyethersulfone; diallyl phthalate resins; styrenic elastomer such as styrene-butadiene rubber (SBR), styrene-butadiene-styrene rubber (SBS), hydrogenated styrene-butadiene rubber (H-SBR), styrene-ethylene-butene-styrene rubber (SEBS), styrene-isoprene-butadiene-styrene rubber (SIBS), hydrogenated styrene-isoprene-butadiene-styrene rubber (SEEPS), partial hydrogenated styrene-butadiene-styrene rubber (SBBS), styrene-isoprene-styrene rubber (SIS); olefinic elastomer such as ethylene-α-olefine copolymer rubber, ethylene-α-olefine-nonconjugated diene copolymer rubber, ethylene-α-olefine copolymer synthesized by using single site catalyst; hard (metha) acrylic resin, and soft and hard (metha) acrylic resin. For example, (metha) acrylic resin such as polymethacrylic acid, polymethyl methacrylate, polymethacrylic acid, polymethyl acrylate, polyacrylic acid, polyethyl methacrylate, polybuthyl methacrylate, polyethyl acrylate and polybuthyl acrylate are included.

The above-mentioned polyamide is the general term for amide-based resins having amide bonds in their repeating units. Examples thereof include nylon 6, nylon 6,6, nylon 12 and the like, a polyamide polyester copolymer, a polyamide polyether copolymer and the like.

As the above-mentioned aliphatic polyester, there can be used one generally commercially available as a biodegradable polyester. Although examples thereof include BIONOLLE (trade name) sold by SHOW A HIGH POLYMER CO., LTD., a resin corresponding to the application or characteristics can be arbitrarily selected. Industrially, there is mentioned one obtained by the dehydration polycondensation reaction and the diol elimination reaction, using an aliphatic dicarboxylic acid and excess diol as starting materials. Such aliphatic polyesters are generally polybutylene succinate, polyethylene succinate and copolymers thereof, and various polymer types are industrially produced.

Aliphatic polyesters suitably used in the present invention include polybutylene succinate (a binary type condensation product of succinic acid and 1,4-butanediol), polybutylene succinate adipate (a tercondensation product of succinic acid, adipic acid and 1,4-butanediol) and the like.

Further, as for aliphatic polyester of the present invention, it is also possible to introduce a reactive group such as an isocyanate group or an urethane group to its structure for the purpose of improving functionality insofar as the biodegradable function is not impaired. Furthermore, as aliphatic polyester of the present invention, there can also be used various copolymers such as copolyesters obtained by copolymerization of polylactic acid and the like.

The glass transition temperature (Tg) of aliphatic polyester used in the present invention is preferably not more than ordinary temperature (25° C.), and more preferably from 10 to 20° C. Exceeding 25° C. results in failure to obtain sufficient antistatic properties.

In the present invention, the antistatic composition is obtained by compounding the above-mentioned aliphatic polyester and the above-mentioned component (B).

In the present invention, from the above-mentioned thermoplastic resins, one or a mixture of two or more of them is suitably selected according to the purpose.

Above all, vinyl monomer polymers or copolymers such as polystyrene and an acrylonitrilebutadiene-styrene copolymer (ABS resin); polypropylene, crystalline propylene copolymers such as a crystalline propylene-ethylene copolymer and a crystalline propylene-butene-1 copolymer, polyethylene, nylon and polybutylene terephthalate are preferred from the viewpoint of formability. In particular, vinyl monomer polymers or copolymers such as polystyrene an acrylonitrile-butadiene-styrene copolymer (ABS resin), polypropylene, propylene copolymer and polyethylene are preferred.

Further, from the viewpoint of heat resistance, polycarbonates, polyethylene terephthalate, aromatic polyimides and aromatic polyethers are preferred.

In the second composition, the ratio of component (J) to the above-mentioned thermoplastic resin (A) is preferably 25 to 3 parts by weight of component (J) to 75 to 97 parts by weight of component (A), and more preferably 20 to 5 parts by weight of component (J) to 80 to 95 parts by weight of component (A), taking (A)+(J) as 100 parts by weight. When the compounding ratio of component (J) exceeds 25 parts by weight, the electric characteristics are good, but the forming shrinkage factor is large, and the dimensional stability is poor, resulting inunsuitability for a precision formed article. On the other hand, when the ratio of component (J) is less than 3 parts by weight, the electric characteristics are insufficient.

In the second composition, the compounding amount of component (B) is preferably from 0.003 to 12.5 parts by weight, and more preferably from 0.03 to 10 parts by weight, based on 100 parts by weight of the total of the above-mentioned component (A) and component (J). Less than 0.003 part by weight results in failure to obtain sufficient antistatic properties, whereas even exceeding 12.5 parts by weight results in no improvement in the antistatic effect, and conversely causes the progress of crystallization, deterioration of materials and the like to lower the antistatic effect.

As a compounding method of metal salt (B) to component (A) and (J), it is possible to directly mix metal salt (B) with the resin by melt mixing or dry blend mixing, when the content of metal salt (B) is as small as 0.01 to 2.5 parts by weight. However, when the content of metal salt (B) is increased, the variation in the dispersibility in the resin sometimes becomes wide. It is therefore desirable to use the metal salt previously dissolved in the above-mentioned compound (C) or the like.

In preparing the second composition, methods for adding the respective components and the order thereof can be suitably selected.

2-1 Composition 2-1 Composition of the present invention is the antistatic composition that the above-mentioned second composition further contains (C) an organic compound which has an —{O (AO)$_n$}— group (A represents an alkylene group having 2 to 4 carbon atoms, and n represents an integer of 1 to 7) and all molecular chain terminals of which are CH$_3$ and/or CH$_2$ groups.

The amount of component (C) added is preferably from 0.1 to 20 parts by weight, and more preferably from 0.3 to 8 parts by weight, based on 10 parts by weight of component (A) and (J). Less than 0.1 part by weight results in the difficulty of obtaining sufficient conductivity, whereas exceeding 20 parts by weight results in a significant reduction in viscosity of the resulting composition, which causes deterioration of physical characteristics, as well as a reduction in forming processability such as draw down properties and deterioration of dimensional stability of a formed article.

In preparing the second composition, methods for adding the respective components and the order thereof can be suitably selected. However, following 4 methods are preferably used;
(1) Method of adding the component (J) in which components (B) and (C) were previously dissolved in the component (A)
(2) Method of adding components (A), (J) and (C) after component (B) is previously dissolved in component (J).
(3) Method of adding components (A) and (B) after component (C) is added to component (J) previously.
(4) Method of adding components (J), (C) and (B) at the same time to the component (A).

In 2-1 composition, the compounding amount of component (B) is the same as above-mentioned second composition.

2-2 Composition 2-2 Composition of the present invention is the antistatic composition that the above-mentioned second composition further contains above-mentioned components (C) and (K) a scale-like inorganic filler and/or a fibrous inorganic filler.

The ratio of component (K) contained in the 2-2 composition is from 3 to 80 parts by weight, and preferably from 5 to 60 parts by weight, based on 100 parts by weight of the total of components (A), (B), (C) and (J). When the ratio of component (K) contained is less than 3parts by weight, the dimensional stability is poor, resulting in unsuitability for a precision formed article. On the other hand, exceeding 80 parts by weight results in deteriorated formability, smoothness of a surface of a formed article and strength.

In preparing the 2-2 composition, methods for adding the respective components and the order thereof can be suitably selected. However, preferably, melt mixing of inorganic filler (K), preferably calcium silicate fiber, after (A), (B), (C) and component (J) have come into a molten state, reduces fiber breakage to prevent the material strength from falling.

In 2-2 composition, the compounding amount of components (B) and (C) are the same as above-mentioned second and 2-1 composition.

2-3 Composition 2-3 Composition of the present invention is the antistatic composition that the above-mentioned second composition further contains above-mentioned component (K).

In preparing the 2-3 composition, methods for adding the respective components and the order thereof can be suitably selected. However, preferably, melt mixing of inorganic filler (K),preferably calcium silicate fiber, after component (A), (B) and (J) have come into a molten state, reduces fiber breakage to prevent the material strength from falling.

In 2-3 composition, the compounding amount of component (B), (J) and (K) are the same as above-mentioned second, 2-1 and 2-2 composition.

Third Composition

The third composition is the antistatic composition, wherein the composition contains 0.001~3.0 parts by weight of (B) at least one lithium salt selected from the group consisting of lithium trifluoromethanesulfonate, lithium bis(trifluoromethanesulfonyl)imide and lithium tris(trifluoromethanesulfonyl)methide based on 100 parts by weight of (L) at least one polymer selected from the group consisting of natural rubber, styrene-butadiene rubber (SBR), isoprene rubber, ethylene-propylene rubber, an ethylene-propylenediene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber and (J) polyether segment-containing antistatic elastomers.

Examples of polymers (L) used in the present invention include rubber-type polymers having a glass transition temperature (Tg) of room temperature or lower, such as natural rubber, styrene-butadiene rubber (SBR), isoprene rubber, ethylene-propylene rubber, an ethylene-propylene-diene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber.

In the third composition, the amount of metal salt (B) compounded is from 0.001 to 3.0 parts by weight, and preferably from 0.3 to 2.4 parts by weight, based on 100 parts by weight of the above-mentioned component (J) and (L). Less than 0.001 part by weight results in insufficient conductivity, whereas exceeding 3.0 parts by weight results in no change in conductivity and deteriorated physical properties.

As a compounding method of metal salt (B) to component (L) and (J), it is possible to directly mix metal salt (B) with the resin by melt mixing or dry blend mixing, when the content of metal salt (B) is as small as 0.01 to 2.5 parts by weight. However, when the content of metal salt (B) is increased, the variation in the dispersibility in the resin becomes wide, and the hazard as described above is accompanied. It is therefore desirable to use the metal salt previously dissolved in the above-mentioned compound (C) or the like.

In the third composition of the present invention, the ratio of component (J) to the above-mentioned component (L) is preferably 25 to 3 parts by weight of component (J) to 75 to 97 parts by weight of component (L), and more preferably 20 to 5 parts by weight of component (J) to 80 to 95 parts by weight of component (L), taking (L)+(J) as 100 parts by weight. When the compounding ratio of component (J) exceeds 25 parts by weight, the electric characteristics are good, but the forming shrinkage factor is large, and the dimensional stability is poor, resulting in unsuitability for a precision formed article. On the other hand, when the ratio of component (J) is less than 3 parts by weight, the electric characteristics are insufficient.

In preparing the third composition, methods for adding the respective components and the order thereof can be suitably selected.

3-1 Composition 3-1 Composition of the present invention is the antistatic composition that the above-mentioned third composition further contains (C) an organic compound which has an —{O (AO)$_n$}— group (A represents an alkylene group having 2 to 4 carbon atoms, and n represents an integer of 1 to 7) and all molecular chain terminals of which are $CH_3$ and/or $CH_2$ groups.

The amount of component (C) added is preferably from 0.1 to 20 parts by weight, and more preferably from 0.3 to 8 parts by weight, based on 100 parts by weight of components (L) and (J). Less than 0.1 part by weight results in the difficulty of obtaining sufficient conductivity, whereas exceeding 20 parts by weight results in a significant reduction in viscosity of the resulting composition, which causes deterioration of physical characteristics, as well as a reduction in forming processability such as draw down properties and deterioration of dimensional stability of a formed article.

In preparing the third composition, methods for adding the respective components and the order thereof can be suitably selected. However, following 4 methods are preferably used;

(1) Method of adding component (J) in which components (B) and (C) were previously dissolved to component (L).
(2) Method of adding component (J) in which component (B) was previously dissolved to components (L) and (C).
(3) Method of adding components (L) and (B) after component (C) was added to component (J) beforehand.
(4) Method of adding components (J), (B) and (C) at the same time to component (L).

In 3-1 composition, the compounding amount of component (B) is the same as above-mentioned third composition.

3-2 Composition 3-2 Composition of the present invention is the antistatic composition that the above-mentioned third composition further contains above-mentioned components (C) and (K) a scale-like inorganic filler and/or a fibrous inorganic filler.

The ratio of component (K) contained in the 3-2 composition is from 3 to 80 parts by weight, and preferably from 5 to 60 parts by weight, based on 100 parts by weight of the total of components (B), (C), (L) and (J). When the ratio of component (K) contained is less than 3 parts by weight, the dimensional stability is poor, resulting in unsuitability for a precision formed article. On the other hand, exceeding 80 parts by weight results in deteriorated formability, smoothness of a surface of a formed article and strength.

In preparing the 3-2 composition, methods for adding the respective components and the order thereof can be suitably selected. However, preferably, melt mixing of inorganic filler (K), preferably calcium silicate fiber, after (B), (C), (L) and component (J) have come into a molten state, reduces fiber breakage to prevent the material strength from falling.

In 3-2 composition, the compounding amount of components (B) and (C) are the same as above-mentioned third and 3-1 composition.

3-3 Composition 3-3 Composition of the present invention is the antistatic composition that the above-mentioned third composition further contains above-mentioned component (K).

In preparing the 3-3 composition, methods for adding the respective components and the order thereof can be suitably selected. However, preferably, melt mixing of inorganic filler (K), preferably calcium silicate fiber, after components (B), (L) and (J) have come into a molten state, reduces fiber breakage to prevent the material strength from falling.

In 3-3 composition, the compounding amount of components (B); (J) and (K) are the same as above-mentioned third, 3-1 and 3-2 composition.

In the component (L)-containing composition of the present invention (the third composition, 3-1, 3-2 and 3-3 composition), a cation of component (B) can easily move in the composition, so that the ionic conductivity is extremely high to exhibit excellent antistatic properties. Further, a solution comprising component (B) and component (C) is excellent in dispersibility and compatibility, so that the occurrence of the bleeding-out on a surface of a formed article can be inhibited to maintain the excellent antistatic properties for a long period of time.

Further, the component (L)-containing composition of the present invention can also be easily colored by adding a pigment as a coloring agent. As the above-mentioned pigments, there are exemplified inorganic pigments such as talc, titanium oxide, iron oxide red, clay, silica white and calcium carbonate, organic pigments such as an azo dye, a phthalocyanine dye and carbon black, and the like. The constitution of the present invention has the advantages of excellent thermal stability and no impairment of physical properties of a substrate resin.

In the present composition (from first to 3-3 composition), when component (C) is contained, the amount of component (B) is from 0.1 to 30 parts by weight, and preferably from 1 to 25 parts by weight, based on 100 parts by weight of the total of component (C). Less than 0.1 part by weight result in failure to obtain sufficient antistatic properties, whereas even exceeding 30 parts by weight results in no improvement in the antistatic effect, and conversely causes the progress of crystallization, deterioration of materials and the like to lower the antistatic effect.

The ratio of component (B) to the total amount of the above-mentionedcomponent (B) and component (C) is preferably from 0.1 to 50% by weight, and more preferably from 0.5 to 30% by weight. When the ratio is less than 0.1% by weight, the antistatic properties are not sufficiently exhibited. On the other hand, exceeding 50% by weight results in saturation of the effect of imparting the antistatic properties, which causes an economical disadvantage.

Further, it is preferred to use the component (B) previously dissolved in the component (C).

Common Matters of the Composition of the Present Invention

The antistatic composition of the present invention (from the first composition to the 3-3 composition) can contain additives such as a stabilizer, a coloring agent, a plasticizer, a dispersing agent, an ultraviolet absorber, an antioxidant, a flame retardant, a stabilizer, a reinforcing agent, a lubricant, a foaming agent, a weather (light) resistant agent and a metal powder, as long as the purpose of the invention is not impaired.

When the antistatic composition of the present invention has biodegradability, it Is preferred that a polymer material and an organic additive arbitrarily added have biodegradable characteristics or are harmless to the natural world. For example, the polymers include a microorganism-derived polyester, polycaprolactone, polylactic acid, modified starch, a polyesteramide and the like. An organic material-based lubricant, a metal salt stabilizer such as calcium, a glycol-based or fatty acid-based wax, petroleum-based wax and the like can also be added. As the coloring agent, there can be used iron oxide red, carbon black, titanium oxide or the like, and as the inorganic filler, there can also be used a special filler such as barium sulfate or a metal powder, as well as natural ore-derived calcium carbonate, talc, mica, calcium silicate, silica or the like. Almost all fillers are generally harmless, and can be suitably added according to the purpose.

In addition to the above-mentioned fillers, it is also possible to blend purified pulp, starch, wood powder, chaff and the like as natural fillers according to the purpose. These organic, inorganic and natural fillers not only enhance the biodegradable function, but also are effective for cost reduction of relatively expensive biodegradable resins.

As the coloring agents used in the compositions of the present invention, all are available as long as they are ones used as coloring agents for synthetic resins. However, in applications intended for biodegradation, biodegradable coloring agents or ones low in toxicity when only the coloring agents remain after degradation are preferred.

Particularly preferred examples of the coloring agents include a food dye and an inorganic pigment. As the food dye, there is available an aluminum lake dye such as red No. 2, No. 3 or No. 40 for food dye, yellow No. 4 or No. 5 for food dye, green No. 3 for food dye, blue No. 1 or No. 2 for food dye, or the like. Furthermore, as the inorganic pigment, there is available titanium oxide, iron oxide red, ultramarine blue or the like.

Although these coloring agents may be used alone, two or more of them are usually combined, thereby being able to mix colors to a desired color tone.

The use of these coloring agents provides formed articles of respective colors, which make it possible to identify the formed articles.

The composition of the present invention is preliminarily mixed and melt kneaded, and can be used as a pelletized compound which is an ordinary fabrication material form. The pellet processing allows the respective components to uniformly preliminarily disperse, thereby being able to obtain stability as a polymer characteristic.

As preliminary mixers used in the processing of the pelletized compounds, there are used blenders for the purposes of preliminary dispersion, distribution and diffusion mixing. Typical examples of the lenders include a ribbon blender, a Henschel mixer (super mixer), a tumbler mixer, a tumble mixer, an air blender and the like. These preliminary mixers are selected according to the plasticizer to be filled, the form of a supplementary material and the level of diffusion. Further, the respective compounding materials may each be put in a melt kneader, using different quantitative cutting-out devices such as Brabender or different quantitative liquid addition devices, respectively, without using the preliminary mixer.

The antistatic compositions of the present invention can be produced without problems using ordinary devices and equipment used for mixing and kneading of usual thermoplastic resins. As an extruder, favorable is a single-screw kneading extruder equipped with a vent or twin-screw kneading extruder equipped with a vent of which screws rotate in the same direction or opposite directions. Further, in place of the extruder, a kneader such as a super mixer, a Banbury mixer, a kneader, a tumbler and a co-kneader may be used.

The melt extruders generally include a single-screw extruder, a twin-screw extruder, a Banbury type, a roll type and the like. Also for these, it is possible to produce the pelletized starting material by selecting them according to the form and purpose of the composition and productivity, followed by melt kneading.

Further, the composition of the present invention can also be used as a powder type obtained by dry blending of the compounding materials it is also possible to produce a starting material of a powder type mixture by dry blending, using the preliminary mixer used in the processing of the above-mentioned pelletized compound.

Furthermore, the composition of the present invention may be one obtained by using a pelletized compound as a master batch, which is obtained by melt kneading parts of the above-mentioned various polymers, components (B) and (J) as essential element, component (A) and (L) may be added and another constituent component such as component (C) and (K) as needed, and mixing it with the remaining polymer components. For example, in preparing the first composition, a master batch in which component (B) is previously added to component (J) mixed with component remainder (J) or (L), further other component such as component (C) and/or (K) are able to added as needed.

Using the composition of the present invention, all forming methods can be applied. That is to say, in forming articles, the composition is melted with each forming machine, and forming processing by various forming machines such as extrusion forming including contour extrusion, injection forming, blow forming, calender forming, vacuum forming and emboss forming is possible. As the typical forming machines for injection forming, extrusion forming and the like, ones having ordinary specifications generally used can be employed.

In the antistatic composition of the present invention, the form of the composition is generally pelletized. However, on the ground that component (C) is usually a liquid, a method of directly adding it to the melt kneader without passing it through the preliminary mixer may be used.

For example, in the case of injection forming, it is possible to use an ordinary injection forming machine. In general, the use of the pelletized compound provides a good finish of a formed article, and a stable physical performance.

When aliphatic polyesters is used as component (A), it is necessary to pay attention to moisture absorption of the starting materials in all forming processing procedures, and preliminary drying and measures against the moisture absorption during forming are important. Insufficient drying causes foaming of a melt composition resulting in the deterioration of the appearance and mechanical characteristics of a formed article. Further, there is also a fear of the deteriorated appearance of a formed article due to a fall inviscosity byhydrolysis. When the film-like formed article is manufactured from antistatic composition of present invention, 0.3 percent by weight or less of the content of water is preferable.

It is desirable to conduct preliminary drying by either method of a hot air type and a vacuum type before forming, and to prevent moisture absorption with a hopper dryer or the like during forming.

The antistatic compositions of the present invention can be suitably used for the antistatic measures of the above-mentioned machine parts, automotive parts, sports goods, office automation equipment, the home electric appliance field, the electric and electronic fields, other various parts, packages, tubes, coverings and the like, making use of their excellent characteristics.

BEST MODE FOR CARRYING OUT THE INVENTION

The present invention is illustrated with reference to examples and comparative examples below, but the present invention is not limited by these examples.

Parts and percentages in examples are on a weight basis unless otherwise noted.

First Composition (Components (J)+(B))

Various types of components used in examples and comparative examples were as follows:

Component (J);

(J-1) :Thermoplastic polyurethane elastomer (PANDEX T-1190 (Tg: −40 to −45° C.) manufactured by DAINIPPON INK & CHEMICALS INC.,)

(B) Metal salt;
Lithium bis(trifluoromethanesulfonyl)imide Li.N(CF$_3$SO$_2$)$_2$ Preparation of Test Pieces Sample pellets were molded into each test piece with an injection molding machine of a mold clamping pressure of 80 tons/cm$^2$. The molding conditions were as follows. Cylinder temperature: 220° C. Mold temperature: 30° C.

As for measurements of physical properties, measurements of the following physical properties were made, after the test piece was controlled at room temperature (23±2° C.) and a relative humidity of 50% for 24 hours.

The Tensile Strength and Elongation

The tensile strength and elongation were measured in accordance with JIS K7311.

Volume Resistivity Value(Antistatic Property)

Measurements were made in accordance with SRIS 2301 in the following manner.

Using an injection molded test sample with 6 (width)×6 (length)×0.3 (thickness) (cm), both ends of the plate were coated as electrodes with a conductive coating to a width of 1 cm. Then, the volume resistivity value between both the electrodes was determined. The unit in the following tables is Ω·cm.

Evaluation of Bleeding-Out

A sample plate with 6 (width)×6 (length)×0.3 (thickness) (cm) was prepared by using a filmgate, and allowed to stand at a temperature of 40° C. and a humidity of 90% for 7 days. The state during that period was visually observed, and evaluated based on the following criteria:

◎: The case that no bleeding was observed.

○: The case that the bleeding was slightly observed, but it was on a level of no problem for use.

Δ: The case that the bleeding was a little observed, and there was a bit of a problem for use.

X: The case that the bleeding was considerably observed to be nonusable.

EXAMPLES 1 TO 6, AND COMPARATIVE EXAMPLE 1 AND 2

Antistatic polyurethane elastomers were prepared based on compounding formulations described in the following tables 1 and 2, and evaluated.

Here, directly formable composition obtained by dry blending was prepared by supermixer.

As for a method for preparing kneaded pelletized compositions, the antistatic polyurethane elastomer compositions were each melt mixed with a 47 mm twin-screw extruder of which screws rotates in the same direction at 190° C. Each strand-like melt mixture extruded from a die was cooled in a water bath, and passed through a cutter to prepare pellets of the antistatic polyurethane elastomer composition. Results are shown in the following tables 1 and 2.

TABLE 1

Composition Obtained by Pelletizing Compound Compounded in Preliminary Mixer

|  | Example 1 | Example 2 | Example 3 | comparative-Example 1 |
|---|---|---|---|---|
| Compounding Formulation (parts) | | | | |
| T-1190 (J-1) | 100 | 100 | 100 | 100 |
| (B-1) | 0.4 | 0.6 | 1.0 | 0 |
| Results of Evaluation | | | | |
| Tensile Strength (MPa) | 31 | 28 | 24 | 26 |
| Elongation (%) | 350 | 380 | 400 | 370 |
| Volume Resistivity Value (Ω·cm) | $2 \times 10^8 \sim 3 \times 10^8$ | $3 \times 10^7 \sim 5 \times 10^7$ | $1 \times 10^7 \sim 2 \times 10^7$ | $2 \times 10^{11} \sim 3 \times 10^{11}$ |

TABLE 1-continued

Composition Obtained by Pelletizing Compound Compounded in Preliminary Mixer

|  |  | Example 1 | Example 2 | Example 3 | comparative-Example 1 |
|---|---|---|---|---|---|
| Bleeding-out (after) | 24 hrs | ◎ | ◎ | ◎ | ○ |
|  | 48 hrs | ◎ | ◎ | ◎ | ○ |
|  | 120 hrs | ◎ | ◎ | ○ | Δ |
|  | 168 hrs | ◎ | ◎ | ○ | Δ |

TABLE 2

Directly Formable Composition Obtained by Dry Blending

|  | Example 4 | Example 5 | Example 6 | Comparative Example 2 |
|---|---|---|---|---|
| Compounding Formulation (parts) |  |  |  |  |
| T-1190 (J-1) | 100 | 100 | 100 | 100 |
| (B-1) | 0.6 | 0.8 | 1.3 | 0 |
| Results of Evaluation |  |  |  |  |
| Tensile Strength (MPa) | 38 | 35 | 30 | 34 |
| Elongation (%) | 400 | 410 | 430 | 400 |
| Volume Resistivity Value ($\Omega \cdot cm$) | $1 \times 10^8 \sim 3 \times 10^8$ | $2 \times 10^7 \sim 3 \times 10^7$ | $1 \times 10^7 \sim 2 \times 10^7$ | $2 \times 10^{11} \sim 3 \times 10^{11}$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ○ | ○ | ○ | Δ |

1-1 Composition (Components (J)+(B)+(C))

As for component (J), the same one used in the first composition was used.

Components (B) and (C);

[(B-2)+(C-1)](20); "Sankonol 0862-15T" (trade name) manufactured by Sanko Chemical Industry CO., Ltd. was used, in which lithium trifluoromethanesulfonate was dissolved as a metal salt in dibutoxyethoxyethyl adipate, in an amount of 15%. Further, solution ([(PN)+(P)](10)) was used as comparative example, in which sodium perchlorate (PN) was contained in alkylene oxide compound $CH_3OCH_2CH_2OCH_2CH_2OH$ in an amount of 10%.

The test piece was prepared in the same way as with the above-mentioned first composition, and physical properties were evaluated.

Results are shown in the following tables 3 and 4.

TABLE 3

Composition Obtained by Pelletizing Compound Compounded in Preliminary Mixer

|  | Example 7 | Example 8 | Example 9 | Comparative-Example 3 |
|---|---|---|---|---|
| Compounding Formulation (parts) |  |  |  |  |
| T-1190 (J-1) | 100 | 100 | 100 | 100 |
| [(B-2) + (C-1)](20) | 2.5 | 4 | 7 | 0 |
| [(PN) + (P)] (10) | 0 | 0 | 0 | 5 |
| Results of Evaluation |  |  |  |  |
| Tensile Strength (MPa) | 31 | 28 | 24 | 26 |
| Elongation (%) | 350 | 380 | 400 | 370 |
| Volume Resistivity Value ($\Omega \cdot cm$) | $2 \times 10^8 \sim 3 \times 10^8$ | $3 \times 10^7 \sim 5 \times 10^7$ | $1 \times 10^7 \sim 2 \times 10^7$ | $2 \times 10^{12} \sim 3 \times 10^{11}$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ◎ | ◎ | ○ | Δ |

TABLE 4

Directly Formable Composition Obtained by Dry Blending

| | Example 10 | Example 11 | Example 12 | Comparative Example 4 |
|---|---|---|---|---|
| Compounding Formulation (parts) | | | | |
| T-1190 (J-1) | 100 | 100 | 100 | 100 |
| [(B-2) + (C-1)](20) | 3 | 5 | 8 | 0 |
| [(PN) + (P)] (10) | 0 | 0 | 0 | 5 |
| Results of Evaluation | | | | |
| Tensile Strength (MPa) | 38 | 35 | 30 | 34 |
| Elongation (%) | 400 | 410 | 430 | 400 |
| Volume Resistivity Value ($\Omega \cdot cm$) | $1 \times 10^8 \sim 3 \times 10^8$ | $2 \times 10^7 \sim 3 \times 10^7$ | $1 \times 10^7 \sim 2 \times 10^7$ | $2 \times 10^{12} \sim 3 \times 10^{11}$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ○ | ○ | ○ | Δ |

1-2 Composition (Components (J)+(B)+(C)+(K))

As for components (J), (B) and (C), the same one used in the first and 1-1 composition was used.

Component (K);
Calcium silicate fiber (K-1) (average fiber diameter=1 to 10 μm, average fiber length=20 to 40 μm, trade name: "KEMOLIT S-3", manufactured by Tsuchiya Kaolin Industries, Ltd.)

[(PN)+(P)](10) and Glass fiber (T-1) (average fiber diameter=13 μm, average fiber length=3 mm, trade name: "Glass Fiber CS-3PE-291S", manufactured by Nitto Boseki Co., Ltd.) were used as a comparative example.

The test piece was prepared in the same way as with the above-mentioned first composition, and physical properties were evaluated. Results are shown in the following tables 5 and 6.

TABLE 5

Composition Obtained by Pelletizing Compound Compounded in Preliminary Mixer

| | Example 13 | Example 14 | Example 15 | Comparative-Example 5 |
|---|---|---|---|---|
| Compounding Formulation (parts) | | | | |
| T-1190 (J-1) | 100 | 100 | 100 | 100 |
| [(B-2) + (C-1)](20) | 2.5 | 4 | 7 | 0 |
| [(PN) + (P)](10) | 0 | 0 | 0 | 5 |
| (K-1) | 5 | 5 | 5 | 0 |
| (T-1) | 0 | 0 | 0 | 5 |
| Results of Evaluation | | | | |
| Tensile Strength (MPa) | 31 | 28 | 24 | 26 |
| Elongation (%) | 350 | 380 | 400 | 370 |
| Volume Resistivity Value ($\Omega \cdot cm$) | $2 \times 10^8 \sim 3 \times 10^8$ | $3 \times 10^7 \sim 5 \times 10^7$ | $1 \times 10^7 \sim 2 \times 10^7$ | $2 \times 10^{12} \sim 3 \times 10^{11}$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ◎ | ◎ | ○ | Δ |

TABLE 6

Directly Formable Composition Obtained by Dry Blending

| | Example 16 | Example 17 | Example 18 | Comparative Example 6 |
|---|---|---|---|---|
| Compounding Formulation (parts) | | | | |
| T-1190 (J-1) | 100 | 100 | 100 | 100 |
| [(B-2) + (C-1)] (20) | 3 | 5 | 8 | 0 |
| [(PN) + (P)] (10) | 0 | 0 | 0 | 5 |
| (K-1) | 5 | 5 | 5 | 0 |
| (T-1) | 0 | 0 | 0 | 5 |
| Results of Evaluation | | | | |
| Tensile Strength (MPa) | 38 | 35 | 30 | 34 |
| Elongation (%) | 400 | 410 | 430 | 400 |

TABLE 6-continued

Directly Formable Composition Obtained by Dry Blending

|  | Example 16 | Example 17 | Example 18 | Comparative Example 6 |
|---|---|---|---|---|
| Volume Resistivity Value (Ω · cm) | $1 \times 10^8$~$3 \times 10^8$ | $2 \times 10^7$~$3 \times 10^7$ | $1 \times 10^7$~$2 \times 10^7$ | $2 \times 10^{12}$~$3 \times 10^{11}$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ○ | ○ | ○ | Δ |

1-3 Composition (Components (J)+(B)+(K))

As for components (J), (B), (K) and (T-1), the same one used in the first and 1-2 composition was used.

The test piece was prepared in the same way as with the above-mentioned first composition, and physical properties were evaluated.

Results are shown in the following tables 7 and 8.

TABLE 7

Composition Obtained by Pelletizing Compound Compounded in Preliminary Mixer

|  | Example 19 | Example 20 | Example 21 | Comparative-Example 7 |
|---|---|---|---|---|
| Compounding Formulation (parts) |  |  |  |  |
| T-1190 (J-1) | 100 | 100 | 100 | 100 |
| (B-1) | 0.4 | 0.6 | 1.0 | 0 |
| (K-1) | 3 | 3 | 3 | 0 |
| (T-1) | 0 | 0 | 0 | 3 |
| Results of Evaluation |  |  |  |  |
| Tensile Strength (MPa) | 31 | 28 | 24 | 26 |
| Elongation (%) | 350 | 380 | 400 | 370 |
| Volume Resistivity Value (Ω · cm) | $2 \times 10^8$~$3 \times 10^8$ | $3 \times 10^7$~$5 \times 10^7$ | $1 \times 10^7$~$2 \times 10^7$ | $2 \times 10^{11}$~$3 \times 10^{11}$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ◎ | ◎ | ○ | Δ |

TABLE 8

Directly Formable Composition Obtained by Dry Blending

|  | Example 22 | Example 23 | Example 24 | Comparative Example 8 |
|---|---|---|---|---|
| Compounding Formulation (parts) |  |  |  |  |
| T-1190 (J-1) | 100 | 100 | 100 | 100 |
| (B-1) | 0.3 | 0.5 | 0.8 | 0 |
| (K-1) | 3 | 3 | 3 | 0 |
| (T-1) | 0 | 0 | 0 | 3 |
| Results of Evaluation |  |  |  |  |
| Tensile Strength (MPa) | 38 | 35 | 30 | 34 |
| Elongation (%) | 400 | 410 | 430 | 400 |
| Volume Resistivity Value (Ω · cm) | $1 \times 10^8$~$3 \times 10^8$ | $2 \times 10^7$~$3 \times 10^7$ | $1 \times 10^7$~$2 \times 10^7$ | $2 \times 10^8$~$3 \times 10^8$ |
| Bleeding-out (after) 24 hrs | ◎ | ◎ | ◎ | ○ |
| 48 hrs | ◎ | ◎ | ◎ | ○ |
| 120 hrs | ◎ | ◎ | ○ | Δ |
| 168 hrs | ○ | ○ | ○ | Δ |

First and 1-1 Composition (Components (J)+(B) and (J)+(B)+(C))

Component (J);

(J-2) PEBAX2533 (trade name) manufactured by ElfAtochem was used as polyamide elastomer.

(J-3) Pelestat 6321 (Tg: −45 to −55° C.) manufactured by Sanyo Chemical Industries, Ltd. was used as polyetheresteramide (hereinafter also referred to as "PEEA" in the following tables).

Metal Salt (B);

Lithium bis(trifluoromethanesulfonyl)imide Li.N—$(CF_3SO_2)_2$ was used alone as metal salt (B-1)

Solution of Metal Salt (B)+Compound (C);

"Sankonol 0862-10T" (trade name) manufactured by Sanko Chemical Industry CO., Ltd. was used as solution [(B-2)+(C-1)] (10), in which lithium trifluoromethanesulfonate was dissolved as a metal salt in dibutoxyethoxyethyl adipate (bis[2-(2-butoxyethoxy)ethyl]adipate) (C-1) represented by the above-mentioned chemical formula (1), in an amount of 10%.

Further, solution ([(PN)+(P)](10)) was used as comparative examples, in which sodium perchlorate (PN) was contained in alkylene oxide compound $CH_3OCH_2CH_2OCH_2CH_2OH$ in an amount of 10%.

Furthermore, low-molecular type hydrophilic surfactant (Q-1), glycerol monostearate (trade name: "RIKRMAL S-100" manufactured by Riken Vitamin Co., Ltd.), was used as an additive in comparative examples.

Preparation of Test Pieces

Sample pellets were molded into each test piece with an injection molding machine of a mold clamping pressure of 80 tons/cm². The molding conditions were as follows. Cylinder temperature: 220° C. Mold temperature: 30° C.

As for measurements of physical properties, measurements of the following physical properties were made, after the test piece was controlled at room temperature (23±2° C.) and a relative humidity of 50% for 24 hours.

Tensile Strength and Elongation

Measurements were made in accordance with JIS K7311.

Volume Resistivity Value (Antistatic Property)

Measurements were made in accordance with SRIS 2301 in the following manner.

Using an injection molded test sample with 6 (width)×6 (length)×0.3 (thickness) (cm), both ends of the plate were coated as electrodes with a conductive coating to a width of 1 cm. Then, the volume resistivity value between both the electrodes was measured. The unit in the following tables is Ω·cm.

Evaluation of Bleeding-out

A sample plate with 6 (width)×6 (length)×0.3 (cm) (thickness) was prepared by using a film gate, and allowed to stand at a temperature of 40° C. and a humidity of 90% for 7 days. The state during that period was visually observed, and evaluated based on the following criteria:

⊚: The case that no bleeding was observed.

○: The case that the bleeding was slightly observed, but it was on a level of no problem for use.

Δ: The case that the bleeding was a little observed, and there was a bit of a problem for use.

X: The case that the bleeding was considerably observed to be nonusable.

EXAMPLES 25 to 30 AND COMPARATIVE EXAMPLE 9 to 13

Compounds compounded with a preliminary mixer based on compounding formulations of Tables 9 or 10 were each turned into a pellet form to prepare antistatic polyamide elastomer compositions, which were evaluated. In Examples 28 to 30, the hazard can be avoided by the use in combination with component (C), so that the workability is excellent and the volume resistivity value can be adjusted low.

As for a method for preparing kneaded pelletized compositions, the antistatic elastomer compositions were each melt mixed with a 47 mm twin-screw extruder of which screws rotates in the same direction at 190° C. Each strand-like melt mixture extruded from a die was cooled in a water bath, and passed through a cutter to prepare pellets of the antistatic elastomer composition. Results are shown in the following tables.

TABLE 9

| | | Examples | | | | | | Comparative Examples | | |
| --- | --- | --- | --- | --- | --- | --- | --- | --- | --- | --- |
| | | 25 | 26 | 27 | 28 | 29 | 30 | 9 | 10 | 11 |
| Compounding Formulation (parts) | | | | | | | | | | |
| Polyamide Elastomer (J-2) | | 100 | 100 | 100 | 100 | 100 | 100 | 100 | 100 | 100 |
| Component (B); (B-1) | | 0.18 | 0.54 | 0.9 | 0 | 0 | 0 | 0 | 0 | 0 |
| Solution [(B-2) + (C-1)] (10) | | 0 | 0 | 0 | 0 | 0 | 0 | 0 | 0 | 0 |
| Solution [(PN) + (P)] (10) | | 0 | 0 | 0 | 0 | 0 | 0 | 0 | 0 | 0 |
| Polyetheresteramide (J-3) | | 10 | 15 | 13 | 10 | 15 | 12.5 | 10 | 15 | 12.5 |
| Results of Evaluation | | | | | | | | | | |
| Tensile Strength (MPa) | | 30 | 28 | 26 | 30 | 28 | 26 | 30 | 28 | 25 |
| Elongation (%) | | 700 | 710 | 730 | 700 | 710 | 730 | 700 | 710 | 730 |
| Volume Resistivity Value (Ω · cm) | | $1 \times 10^9 \sim$ $3 \times 10^9$ | $8 \times 10^7 \sim$ $1 \times 10^8$ | $5 \times 10^7 \sim$ $8 \times 10^7$ | $2 \times 10^8 \sim$ $3 \times 10^8$ | $3 \times 10^7 \sim$ $5 \times 10^7$ | $1 \times 10^7 \sim$ $2 \times 10^7$ | $2 \times 10^8 \sim$ $3 \times 10^8$ | $4 \times 10^7 \sim$ $5 \times 10^7$ | $1 \times 10^7 \sim$ $2 \times 10^7$ |
| Bleeding-out (After) | 24 hrs | ⊚ | ⊚ | ⊚ | ⊚ | ⊚ | ⊚ | ○ | ○ | Δ |
| | 48 hrs | ⊚ | ⊚ | ⊚ | ⊚ | ⊚ | ⊚ | ○ | Δ | Δ |
| | 120 hrs | ⊚ | ⊚ | ⊚ | ⊚ | ⊚ | ○ | Δ | Δ | Δ |
| | 168 hrs | ⊚ | ⊚ | ⊚ | ⊚ | ⊚ | ○ | Δ | Δ | Δ |

TABLE 10

|  | Comparative Example | |
| --- | --- | --- |
|  | 12 | 13 |
| Compounding Formulation (parts) | | |
| Polyamide Elastomer; (J-2) | 100 | 100 |
| Component (B); (B-1) | 0 | 0 |
| Solution [(B-2) + (C-1)] (10) | 0 | 0 |
| (Q-1) | 3 | 3 |
| Polyetheresteramide (J-3) | 10 | 12.5 |
| Forming Method | Formed after pelletizing | Directly formed by dry blending |
| Results of Evaluation | | |
| Tensile Strength (MPa) | 11 | 11 |
| Elongation (%) | 800 | 800 |
| Volume Resistivity Value ($\Omega \cdot cm$) | $1 \times 10^{12}$~$6 \times 10^{12}$ | $8 \times 10^{11}$~$4 \times 10^{12}$ |
| Bleeding-out (After) 24 hrs | Δ | Δ |
| 48 hrs | X | X |
| 120 hrs | X | X |
| 168 hrs | X | X |

From the examples of the above tables, the physical properties such as the tensile strength and elongation were not impaired, the conductive materials hardly bled out, and the electric resistivity and formability were good, for all the compositions of the present invention. On the other hand, comparative examples 12 and 13 of Table 10 were unsuitable for the purpose of the present invention, because the conductive materials easily bled out and the electric resistivity was also high.

Second and 2-1 Composition ((A)+(J)+(B) and (A)+(J)+(B)+(C))

Various types of components used in examples and comparative examples are as follows:

Method for Preparing Samples

Component (A);

3020 Manufactured by SHOW A HIGH POLYMER CO., LTD. (A-1) having a melt flow rate (MFR) value of 19.5 to 29.4 g/10 minutes was used as aliphatic polyester resin (A).

Component (B);

Lithium trifluoromethanesulfonate (B-2) and lithium tris (trifluoromethanesulfonyl)methide (B-3) were each used as metal salt (B), and dissolved in an amount of 25 parts based on 100 parts of dibutoxyethoxyethyl adipate (C-1) to obtain metal salt-compound mixtures [(B-2)+(C-1)](25) and [(B-3)+(C-1)](25), respectively.

Component (J);

(J-3) Pelestat 6321 (Tg: −45 to −55° C.) manufactured by Sanyo Chemical Industries, Ltd. was used as polyetheresteramide (PEEA).

Methods for Evaluating Physical Properties

The physical properties were measured in accordance with the ASTM Standards. Molding was conducted by injection molding, using an injection molding machine of a mold clamping pressure of 80 tons/cm$^2$, setting the cylinder temperature to 100 to 130° C. and the mold temperature to 30° C. The molded test piece was controlled at 25° C. at 50% RH for 24 hours, and measurements were made in accordance with the following standards.

Measurements were each made according to ASTM D638 using No. 1 test piece for the tensile test, according to ASTM D792 using a ¼ in. test piece for the bending test, according to ASTM D648 using a ¼ in. thick test piece at a low load for the thermal deformation test, according to ASTM D792 for the specific gravity, and according to ASTM D1238 at 220° C. for the melt flow rate (MFR).

Methods for Evaluating Antistatic Properties

Using HIRESTA measuring (machine name) manufactured by Mitsubishi Chemical Corporation, measurements were made by the constant voltage method at an applied voltage of 500 V according to ASTM D257. As a test piece, a 6 (width)×6 (length)×0.3(thickness)(cm) injection molded plate was used. Immediately after molding, it was allowed to stand in a desiccator maintained at an environmental temperature of 25° C.±2° C. and a relative humidity of 20% or less for 24 hours, and then the surface resistivity value and the volume resistivity value were measured (before moisture conditioning). Then, similar measurements were made for the sample allowed to stand at an environmental temperature of 25° C.±2° C. and a relative humidity of 50% RH for 24 hours (after moisture conditioning).

Using the ASTM D638 No. 1 tensile test piece allowed to stand at an environmental temperature of 25° C.±2° C. and a relative humidity of 50% RH for 24 hours, the surface resistivity value of a dumbbell-drawn portion after the test piece was drawn 3 times was measured (after moisture conditioning and dumbbell drawing).

Surface Appearance of Formed Article

The surface appearance of a 6 (width)×6 (length)×0.3 (thickness) (cm) injection molded plate similar to the above-mentioned test piece was visually observed to evaluate sink marks, lumpy and flashing.

Method for Evaluating Biodegradability

Natural environment water (river water) to which aqueous inorganic salt solution A (KH$_2$PO$_4$; 8.50 g/liter, K$_2$HPO$_4$; 21.75 g/liter, Na$_2$HPO$_4$.H$_2$O; 33.30 g/liter, NH$_4$Cl; 1.70 g/liter), aqueous inorganic salt solution (B) (MgSO$_4$.7H$_2$O; 22.50 g/liter), aqueous inorganic salt solution (C) (CaCl$_2$; 27.50 g/liter) and aqueous inorganic salt solution (D) (FeCl$_3$.6H$_2$O; 0.25 g/liter) were each added in an amount of 0.1%, and a 200 μm thick test sample film were put in a glass culture flask equipped with a buret. A sample preparation solution in the above-mentioned culture flask was cultured at 25° C. under aerobic conditions, and the biochemical oxygen demand (BOD) after 28 days was determined, using a BOD measuring device. Based on the BOD value, the decomposition rate (%) was determined by the following equation:

Decomposition rate (%)=[{(the BOD value of a culture solution for a subject material)−(the BOD value of a culture solution for a biological blank test)}/the theoretical oxygen demand]×100

Evaluation of Bleeding-Out

A sample plate with 6 (width)×6 (length)×0.3 (cm) (thickness) was prepared by using a film gate, and allowed to stand at a temperature of 40° C. and a humidity of 90% for 7 days. The state during that period was visually observed, and evaluated based on the following criteria:

◉: The case that no bleeding was observed.

○: The case that the bleeding was slightly observed, but it was on a level of no problem for use.

Δ: The case that the bleeding was a little observed, and there was a bit of a problem for use.

X: The case that the bleeding was considerably observed to be nonusable.

EXAMPLES 31 TO 35

Dibutoxyethoxyethyl adipate/ lithium trifluoro-methanesulfonate mixture [(B-2)+(C-1)](20) was added in amounts of 0.5, 1.0, 3.0, 5.0 and 10 parts, respectively, based on 100 parts of aliphatic polyester resin (A-1), and pellet of PEEA (J-3) was further added in an amount of desired amount and mixed using a tumbler mixer.

Melt kneading was conducted, using a twin-screw extruder having a screw diameter of 20 mm, of which screws rotates in the opposite directions, as a melt kneader, and setting the cylinder temperature to 130° C. The resin melted was extruded in a strand form, cooled by water cooling, and then fed to a pelletizer to prepare pellets. Results are shown in the following table 11.

EXAMPLES 36 AND 37

Lithium trifluoromethanesulfonate (B-2) and pellet of PEEA (J-3) were directly mixed with aliphatic polyester (A-1), followed by forming. Results are shown in the following table 12.

EXAMPLES 38 TO 40

Dibutoxyethoxyethyl adipate/lithium trifluoro-methanesulfonate mixture [(B-2)+(C-1)](10) was dry blended in amounts of 0.5, 3.0 and 10 parts, respectively, based on 100 parts of aliphatic polyester resin (A-1), to prepare powdery compositions, which were mixed using a tumbler mixer and directly melt formed with an injection forming machine. Results are shown in the following table 12.

EXAMPLES 41 TO 45

Using lithium tris(trifluoromethanesulfonyl)methide (B-3), pellets were prepared by melt kneading in the same manner as described above, and formed. Results are shown in the following table 13.

EXAMPLES 46 AND 47

Lithium tris(trifluoromethanesulfonyl)methide (B-3) was directly mixed with aliphatic polyester (A-1), and the mixture was formed. Results are shown in the following table 14.

EXAMPLES 48 TO 50

Dry blending was conducted in the same manner as described above to obtain powdery compositions, which were directly formed. Results are shown in the following table 14.

COMPARATIVE EXAMPLES 14 to 18

In Example 31 to 35, conductive fillers [Ketchen Black EC (trade name) (R-1) manufactured by LION CORPORATION and Denka Black (trade name, acetylene carbon black) (R-2) manufactured by DENKI KAGAKU KOGYO KABUSHIKI KAISHA] were each used in place of the metal salt-compound mixture. Results are shown in the following table 15 and 16.

TABLE 11

| | Example | | | | |
|---|---|---|---|---|---|
| | 31 | 32 | 33 | 34 | 35 |
| Compounding Formulation (parts) | | | | | |
| Aliphatic Polyester (A-1) | 100 | 100 | 100 | 100 | 100 |
| Dibutoxyethoxyethyl Adipate (C-1) | 0.4 | 0.8 | 2.4 | 4.0 | 8 |
| Lithium trifluoromethanesulfonate (B-2) | 0.1 | 0.2 | 0.6 | 1 | 2 |
| Polyetheresteramide (J-3) | 5 | 10 | 15 | 20 | 20 |
| Results of Evaluation | | | | | |
| Tensile Strength (Yield Point) (MPa) | 20 | 19 | 19 | 18 | 15 |
| Bending Strength (MPa) | 320 | 320 | 290 | 260 | 210 |
| Thermal Deformation Temperature (° C.) | 77 | 77 | 75 | 74 | 71 |
| Surface Resistivity Value (Ω/sq.) | | | | | |
| Before moisture conditioning | $3 \times 10^{11}$ | $1 \times 10^{11}$ | $2 \times 10^{10}$ | $5 \times 10^9$ | $1 \times 10^9$ |
| After moisture conditioning (24 hrs) | $1 \times 10^{11}$ | $6 \times 10^{10}$ | $7 \times 10^9$ | $1 \times 10^9$ | $4 \times 10^8$ |
| After moisture conditioning and dumbbell drawing | $6 \times 10^{11}$ | $2 \times 10^{11}$ | $1 \times 10^{10}$ | $3 \times 10^9$ | $9 \times 10^8$ |
| Volume Resistivity Value (Ω · cm) | | | | | |
| Before moisture conditioning | $2 \times 10^{10}$ | $1 \times 10^{10}$ | $1 \times 10^9$ | $4 \times 10^8$ | $7 \times 10^7$ |
| After moisture conditioning (24 hrs) | $1 \times 10^{10}$ | $7 \times 10^9$ | $6 \times 10^8$ | $1 \times 10^8$ | $4 \times 10^7$ |
| MFR (180° C., g/10 min.) | 22 | 25 | 30 | 35 | 50 |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 12

| | Example | | | | |
|---|---|---|---|---|---|
| | 36 | 37 | 38 | 39 | 40 |
| Compounding Formulation (parts) | | | | | |
| Aliphatic Polyester (A-1) | 100 | 100 | 100 | 100 | 100 |
| Dibutoxyethoxyethyl Adipate (C-1) | — | — | 0.4 | 2.4 | 8 |
| Lithium trifluoromethanesulfonate (B-2) | 0.1 | 2 | 0.1 | 0.6 | 2 |
| Polyetheresteramide (J-3) | 5 | 10 | 5 | 10 | 12 |
| Results of Evaluation | | | | | |
| Tensile Strength (Yield Point) (MPa) | 20 | 19 | 20 | 19 | 16 |
| Bending Strength (MPa) | 340 | 340 | 330 | 300 | 220 |
| Thermal Deformation Temperature (° C.) | 77 | 77 | 77 | 75 | 71 |
| Surface Resistivity Value (Ω/sq.) | | | | | |
| Before moisture conditioning | $8 \times 10^{11}$ | $3 \times 10^{10}$ | $2 \times 10^{11}$ | $3 \times 10^{10}$ | $2 \times 10^{9}$ |
| After moisture conditioning (24 hrs) | $8 \times 10^{11}$ | $3 \times 10^{9}$ | $2 \times 10^{11}$ | $6 \times 10^{9}$ | $5 \times 10^{8}$ |
| After moisture conditioning and dumbbell drawing | $8 \times 10^{11}$ | $7 \times 10^{9}$ | $5 \times 10^{11}$ | $1 \times 10^{10}$ | $9 \times 10^{8}$ |
| Volume Resistivity Value (Ω·cm) | | | | | |
| Before moisture conditioning | $7 \times 10^{10}$ | $7 \times 10^{8}$ | $3 \times 10^{10}$ | $2 \times 10^{9}$ | $8 \times 10^{7}$ |
| After moisture conditioning (24 hrs) | $7 \times 10^{10}$ | $8 \times 10^{8}$ | $2 \times 10^{10}$ | $5 \times 10^{8}$ | $6 \times 10^{7}$ |
| MFR (180° C., g/10 min.) | 15 | 40 | — | — | — |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 13

| | Example | | | | |
|---|---|---|---|---|---|
| | 41 | 42 | 43 | 44 | 45 |
| Compounding Formulation (parts) | | | | | |
| Aliphatic Polyester (A-1) | 100 | 100 | 100 | 100 | 100 |
| DibutoxyethoxyethylAdipate (C-1) | 0.4 | 0.8 | 2.4 | 4.0 | 8 |
| Lithium tris(trifluoromethanesulfonyl)methide | 0.1 | 0.2 | 0.6 | 1 | 2 |
| Polyetheresteramide (J-3) | 7.5 | 10 | 10 | 10 | 12 |
| Results of Evaluation | | | | | |
| Tensile Strength (Yield Point) (MPa) | 20 | 19 | 19 | 18 | 15 |
| Bending Strength (MPa) | 320 | 330 | 290 | 265 | 215 |
| Thermal Deformation Temperature (° C.) | 77 | 77 | 75 | 74 | 72 |
| Surface Resistivity Value (Ω/sq.) | | | | | |
| Before moisture conditioning | $5 \times 10^{11}$ | $2 \times 10^{11}$ | $4 \times 10^{10}$ | $7 \times 10^{9}$ | $4 \times 10^{9}$ |
| After moisture conditioning (24 hrs) | $2 \times 10^{11}$ | $7 \times 10^{10}$ | $9 \times 10^{9}$ | $3 \times 10^{9}$ | $6 \times 10^{8}$ |
| After moisture conditioning and dumbbell drawing | $8 \times 10^{11}$ | $4 \times 10^{11}$ | $3 \times 10^{10}$ | $5 \times 10^{9}$ | $4 \times 10^{9}$ |
| Volume Resistivity Value (Ω·cm) | | | | | |
| Before moisture conditioning | $3 \times 10^{10}$ | $3 \times 10^{10}$ | $4 \times 10^{9}$ | $6 \times 10^{8}$ | $9 \times 10^{7}$ |
| After moisture conditioning (24 hrs) | $2 \times 10^{10}$ | $9 \times 10^{9}$ | $8 \times 10^{8}$ | $3 \times 10^{8}$ | $8 \times 10^{7}$ |
| MFR (180° C., g/10 min.) | 23 | 26 | 31 | 37 | 52 |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 14

| | Example | | | | |
|---|---|---|---|---|---|
| | 46 | 47 | 48 | 49 | 50 |
| Compounding Formulation (parts) | | | | | |
| Aliphatic Polyester (D-1) | 100 | 100 | 100 | 100 | 100 |
| Dibutoxyethoxyethyl Adipate (C-1) | — | — | 0.4 | 2.4 | 8 |
| Lithium tris (trifluoromethanesulfonyl) methide | 0.1 | 2 | 0.1 | 0.6 | 2 |
| Polyetheresteramide (J-3) | 7.5 | 10 | 10 | 10 | 12 |
| Results of Evaluation | | | | | |
| Tensile Strength (Yield Point) (MPa) | 20 | 20 | 20 | 19 | 17 |
| Bending Strength (MPa) | 340 | 340 | 335 | 310 | 220 |
| Thermal Deformation Temperature (° C.) | 77 | 77 | 77 | 75 | 71 |
| Surface Resistivity Value (Ω/sq.) | | | | | |
| Before moisture conditioning | $9 \times 10^{11}$ | $5 \times 10^{10}$ | $4 \times 10^{11}$ | $5 \times 10^{10}$ | $4 \times 10^{9}$ |
| After moisture conditioning (24 hrs) | $9 \times 10^{11}$ | $5 \times 10^{9}$ | $5 \times 10^{11}$ | $8 \times 10^{9}$ | $7 \times 10^{8}$ |
| After moisture conditioning and dumbbell drawing | $9 \times 10^{11}$ | $9 \times 10^{9}$ | $7 \times 10^{11}$ | $4 \times 10^{10}$ | $2 \times 10^{9}$ |
| Volume Resistivity Value (Ω·cm) | | | | | |
| Before moisture conditioning | $8 \times 10^{10}$ | $9 \times 10^{8}$ | $5 \times 10^{10}$ | $5 \times 10^{9}$ | $1 \times 10^{8}$ |
| After moisture conditioning (24 hrs) | $9 \times 10^{10}$ | $2 \times 10^{9}$ | $5 \times 10^{10}$ | $8 \times 10^{8}$ | $8 \times 10^{7}$ |
| MFR (180° C., g/10 min.) | 18 | 45 | — | — | — |
| Surface Appearance of Formed Article | Good | Good | Good | Good | Good slightly sink marks |
| Bleeding-out | Nil | Nil | Nil | Nil | Nil |
| Biodegradability (after 28 days, %) | 60 or more | 60 or more | 60 or more | 60 or more | 60 or more |

TABLE 15

| | Comparative Example | | |
|---|---|---|---|
| | 14 | 15 | 16 |
| Compounding Formulation (parts) | | | |
| Aliphatic Polyester (A-1) | 100 | 100 | 100 |
| Carbon Black (R-1) | — | 5 | 10 |
| Carbon Black (R-2) | — | — | — |
| Polyetheresteramide (J-3) | 10 | 10 | 10 |
| Results of Evaluation | | | |
| Tensile Strength (Yield Point) (MPa) | 20 | 22 | 23 |
| Bending Strength (MPa) | 340 | 360 | 380 |
| Thermal Deformation Temperature (° C.) | 77 | 78 | 79 |
| Surface Resistivity Value (Ω/sq.) | | | |
| Before moisture conditioning | $10^{14}$ | $10^{9}$-$10^{11}$ | $10^{5}$-$10^{6}$ |
| After moisture conditioning (24 hrs) | $10^{14}$ | $10^{9}$-$10^{11}$ | $10^{5}$-$10^{6}$ |
| After moisture conditioning and dumbbell drawing | $3 \times 10^{14}$ | Conductivity was not measured | $10^{12}$ or more with wide variation |
| Volume Resistivity Value (Ω·cm) | | | |
| Before moisture conditioning | $10^{14}$ | $10^{9}$-$10^{10}$ | $10^{4}$-$10^{5}$ |
| After moisture conditioning (24 hrs) | $10^{14}$ | $10^{9}$-$10^{10}$ | $10^{4}$-$10^{5}$ |
| MFR (180° C., g/10 min.) | 20 | 13 | 5 |
| Surface Appearance of Formed Article | Good | Lumpy | Lumpy |
| Bleeding-out | Nil | Nil | Nil |
| Biodegradability (after 28 days, %) | 60 or more | 35 | 20 |

TABLE 16

| | Comparative Example | |
|---|---|---|
| | 17 | 18 |
| Compounding Formulation (parts) | | |
| Aliphatic Polyester (D-1) | 100 | 100 |
| Carbon Black (R-1) | — | — |
| Carbon Black (R-2) | 15 | 23 |
| Polyetheresteramide (J-3) | 10 | 10 |
| Results of Evaluation | | |
| Tensile Strength (Yield Point) (MPa) | 19 | 19 |
| Bending Strength (MPa) | 320 | 290 |
| Thermal Deformation Temperature (° C.) | 77 | 75 |
| Surface Resistivity Value (Ω/sq.) | | |
| Before moisture conditioning | $10^{8}$-$10^{10}$ | $10^{5}$-$10^{6}$ |
| After moisture conditioning (24 hrs) | $10^{8}$-$10^{10}$ | $10^{5}$-$10^{6}$ |
| After moisture conditioning and dumbbell drawing | $10^{12}$ or more | $10^{8}$-$10^{12}$ |
| Volume Resistivity Value (Ω·cm) | | |
| Before moisture conditioning | $10^{7}$-$10^{9}$ | $10^{4}$-$10^{5}$ |
| After moisture conditioning (24 hrs) | $10^{7}$-$10^{9}$ with wide variation | $10^{4}$-$10^{5}$ with wide variation |
| MRF (180° C., g/10 min.) | 10 | 4 |
| Surface Appearance of Formed Article | Good | Flashing |
| Bleeding-out | Nil | Nil |
| Biodegradability (after 28 days, %) | 30 | 20 |

Component (A);

(A-2): A polyether/polyester-based thermoplastic polyester elastomer resin (PELPRENE P-40B (trade name) 5 manufactured by TOYOBO CO., LTD., hardness D=31).

(A-3): A polyether/polyester-based thermoplastic polyester elastomer resin (PELPRENE P-280 (trade name) manufactured by TOYOBO CO., LTD., hardness D=68).

(B-1): Lithium bis(trifluoromethanesulfonyl)imide [$(CF_3SO_2)_2NIi$]

[(B-1)+(C-1)](20):
"Sankonol 0862-20R (trade name)" manufactured by Sanko Chemical Industry CO., Ltd. was used in which (B-1) was dissolved in dibutoxyethoxyethyl adipate (C-1) in an amount of 20%.

As a comparative example, [(PN)+(P)](10) was used.

As comparative examples, there was used "RIKEMAL S-100" (trade name) (low-molecular type hydrophilic surfactant, glycerol monostearate) (Q-1) manufactured by Riken Vitamin Co., Ltd.

As the conductive filler (carbon black), there was used "NITERON #10" (trade name) (furnace black) (R-3) manufactured by Nippon Steel Chemical Co., Ltd.

Component (J);
(J-3) Pelestat 6321 (Tg: −45 to −55° C.) manufactured by Sanyo Chemical Industries, Ltd. was used as polyetheresteramide (PEEA).

Preparation of Pelletized Antistatic Polyetherester-amide Composition by Preliminary Mixer Lithium bis(trifluoromethanesulfonyl)imide or Sankonol 0862-20R ((B-1)+(C-1) (20)) were added to polyetheresteramide in the desired amount and prepared the antistatic polyetheresteramide composition by using a 40 mm single-screw extruder. Kneading temperature was 220 to 230° C.

Preparation of Test Pieces

Each test piece was molded from sample pellets with an injection molding machine of a mold clamping pressure of 80 tons/cm². For the molding conditions, the cylinder temperature was 220° C. and the mold temperature was 40° C.

Measurements of Physical Properties

After the test piece was controlled at 23±2° C. and a relative humidity of 50% RH for 24 hours, measurements of the following physical properties were made.

The surface hardness was determined according to ASTM D2240. Measurements were each made according to ASTM D638 for the tensile strength and elongation, and according to ASTM D1238 at 230° C. at 2,160 g for the melt flow rate.

Volume Resistivity Value (Antistatic Property)

Measurements were made in accordance with SRIS 2301 in the following manner.

Using an injection molded test sample with 6 (width)×6 (length)×0.3 (thickness) (cm), both ends of the plate were coated as electrodes with a conductive coating to a width of 1 cm. Then, the volume resistivity value between both the electrodes was determined. The unit in the following tables is Ω·cm.

Coloring Properties

Using organic pigments, inorganic pigments and the like, one which was colorable to basic colors (red, green, yellow, white and blue) was evaluated as good.

Evaluation of Bleeding-Out

A sample plate with 6 (width)×6 (length)×0.3 (cm) (thickness) was prepared by using a film gate, and allowed to stand at a temperature of 40° C. and a humidity of 90% for 7 days. The state during that period was visually observed, and evaluated based on the following criteria:

⊚: The case that no bleeding was observed.

○: The case that the bleeding was slightly observed, but it was on a level of no problem for use.

Δ: The case that the bleeding was a little observed, and there was a bit of a problem for use.

X: The case that the bleeding was considerably observed to be nonusable.

EXAMPLES 51 TO 61 AND COMPARATIVE EXAMPLES 19 to 28

Based on compounding formulations of the following tables, antistatic polyester elastomer compositions were prepared and evaluated.

Pelletized compositions (compounds) obtained by melt kneading were each prepared by melt mixing the above-mentioned components and other components with a 47 mm twin-screw extruder of which screws rotates in the same direction at 220° C., cooling a strand-like melt composition extruded from a die in a water bath, and passing it through a cutter. For the conductive materials used in the above-mentioned comparative examples, compounds were also similarly prepared.

Further, directly formable antistatic compositions obtained by dry blending were prepared by compounding, mixing and preliminarily dry blending the components in a tumbler mixer. For the conductive materials used in the above-mentioned comparative examples, compounds were also similarly prepared.

Results are shown in the following tables 17-21.

TABLE 17

| Compounding | Example | | | | |
|---|---|---|---|---|---|
| Formulation (parts) | 51 | 52 | 53 | 54 | 55 |
| (A-2) Hardness D = 31 | 100 | 100 | 0 | 0 | 100 |
| (A-3) Hardness D = 68 | 0 | 0 | 100 | 100 | 0 |
| [(B-1) + (C-1)](20)*1 | 1 | 5 | 1 | 5 | 1 |
| (B)*2 | (0.2) | (1.0) | (0.2) | (1.0) | (0.2) |
| (J-3) PEEA | 20 | 20 | 20 | 20 | 30 |
| Results of Evaluation of Article Formed after Pelletizing | | | | | |
| Hardness D | 32 | 31 | 69 | 68 | 31 |
| Tensile Strength (MPa) | 14 | 13 | 37 | 33 | 13 |
| Elongation (%) | 800 | 820 | 510 | 520 | 820 |
| Volume Resistivity Value (Ω · cm) | $2 \times 10^8$~$3 \times 10^8$ | $6 \times 10^7$~$8 \times 10^8$ | $6 \times 10^8$~$8 \times 10^8$ | $8 \times 10^7$~$1 \times 10^8$ | $2 \times 10^7$~$3 \times 10^7$ |
| Bleeding-out  24 hrs | ⊚ | ⊚ | ⊚ | ⊚ | ⊚ |
| (after)  48 hrs | ⊚ | ⊚ | ⊚ | ⊚ | ⊚ |
| 120 hrs | ⊚ | ⊚ | ⊚ | ⊚ | ⊚ |
| 168 hrs | ⊚ | ⊚ | ⊚ | ⊚ | ⊚ |
| Coloring Properties | Good | Good | Good | Good | Good |

TABLE 17-continued

| Compounding | Example | | | | |
|---|---|---|---|---|---|
| Formulation (parts) | 51 | 52 | 53 | 54 | 55 |
| Results of Evaluation of Article Directly Formed by Dry Blending | | | | | |
| Hardness D | 32 | 31 | 68 | 68 | 30 |
| Tensile Strength (MPa) | 14 | 13 | 38 | 38 | 13 |
| Elongation (%) | 800 | 820 | 500 | 490 | 830 |
| Volume Resistivity Value ($\Omega \cdot cm$) | $2 \times 10^8 \sim 3 \times 10^8$ | $6 \times 10^7 \sim 8 \times 10^8$ | $6 \times 10^8 \sim 8 \times 10^8$ | $8 \times 10^7 \sim 1 \times 10^8$ | $1 \times 10^7 \sim 2 \times 10^7$ |
| Bleeding-out   24 hrs | ◎ | ◎ | ◎ | ◎ | ◎ |
| (after)   48 hrs | ◎ | ◎ | ◎ | ◎ | ◎ |
|   120 hrs | ◎ | ◎ | ◎ | ◎ | ◎ |
|   168 hrs | ◎ | ◎ | ◎ | ◎ | ◎ |
| Coloring Properties | Good | Good | Good | Good | Good |

TABLE 18

| Compounding | Example | | | | |
|---|---|---|---|---|---|
| Formulation (parts) | 56 | 57 | 58 | 59 | 60 |
| (A-2) Hardness D = 31 | 100 | 100 | 0 | 0 | 0 |
| (A-3) Hardness D = 68 | 0 | 0 | 100 | 100 | 100 |
| [(B-1) + (C-1)] (20)*1 | 3 | 5 | 1 | 3 | 5 |
| (B)*2 | (0.6) | (1.0) | (0.2) | (0.6) | (1.0) |
| (J-3) PEEA | 30 | 30 | 30 | 30 | 30 |
| Results of Evaluation of Article Formed after Pelletizing | | | | | |
| Hardness D | 30 | 28 | 68 | 67 | 66 |
| Tensile Strength (MPa) | 12 | 11 | 36 | 34 | 30 |
| Elongation (%) | 830 | 850 | 520 | 550 | 570 |
| Volume Resistivity Value ($\Omega \cdot cm$) | $8 \times 10^6 \sim 1 \times 10^7$ | $6 \times 10^6 \sim 8 \times 10^6$ | $5 \times 10^7 \sim 8 \times 10^7$ | $2 \times 10^7 \sim 3 \times 10^7$ | $8 \times 10^6 \sim 1 \times 10^7$ |
| Bleeding-out   24 hrs | ◎ | ◎ | ◎ | ◎ | ○ |
| (after)   48 hrs | ◎ | ◎ | ◎ | ◎ | ○ |
|   120 hrs | ◎ | ○ | ◎ | ◎ | ○ |
|   168 hrs | ◎ | ○ | ◎ | ◎ | ○ |
| Coloring Properties | Good | Good | Good | Good | Good |
| Results of Evaluation of Article Directly Formed by Dry Blending | | | | | |
| Hardness D | 29 | 27 | 68 | 67 | 66 |
| Tensile Strength (MPa) | 12 | 11 | 37 | 35 | 33 |
| Elongation (%) | 840 | 860 | 510 | 530 | 550 |
| Volume Resistivity Value ($\Omega \cdot cm$) | $6 \times 10^6 \sim 8 \times 10^6$ | $4 \times 10^6 \sim 6 \times 10^6$ | $2 \times 10^7 \sim 4 \times 10^7$ | $7 \times 10^6 \sim 1 \times 10^7$ | $7 \times 10^6 \sim 1 \times 10^7$ |
| Bleeding-out   24 hrs | ◎ | ◎ | ◎ | ◎ | ○ |
| (after)   48 hrs | ◎ | ○ | ◎ | ◎ | ○ |
|   120 hrs | ◎ | ○ | ◎ | ○ | ○ |
|   168 hrs | ○ | ○ | ◎ | ○ | ○ |
| Coloring Properties | Good | Good | Good | Good | Good |

TABLE 19

| | Comparative Example 19 | Comparative Example 20 | Example 61 |
|---|---|---|---|
| Compounding Ratio (parts) | | | |
| (A-2) Hardness D = 31 | 100 | 0 | 100 |
| (A-3) Hardness D = 68 | 0 | 100 | 0 |
| [(B-1) + (C-1)](20)*1 | 0 | 0 | 0 |
| (B)*2 | 0 | 0 | 0 |
| [(PN) + (P)](10) | 0 | 0 | 1 |
| (Q-1) | 0 | 0 | 0 |
| (R-3) | 0 | 0 | 0 |
| (J-3) PEEA | 0 | 0 | 5 |
| Results of Evaluation of Article Formed after Pelletizing | | | |
| Hardness D | 31 | 68 | 31 |
| Tensile Strength (MPa) | 14 | 38 | 13 |
| Elongation (%) | 800 | 500 | 820 |
| Volume Resistivity Value ($\Omega \cdot cm$) | $1 \times 10^{13}$ or more | $1 \times 10^{14}$ or more | $2 \times 10^{11} \sim 4 \times 10^{11}$ |

TABLE 19-continued

|  |  | Comparative Example 19 | Comparative Example 20 | Example 61 |
|---|---|---|---|---|
| Bleeding-out (after) | 24 hrs | ⊚ | ⊚ | ○ |
|  | 48 hrs | ⊚ | ⊚ | ○ |
|  | 120 hrs | ⊚ | ⊚ | Δ |
|  | 168 hrs | ⊚ | ⊚ | Δ |
| Coloring Properties |  | Good | Good | Good |
| Results of Evaluation of Article Directly Formed by Dry Blending ||||| 
| Hardness D |  | 31 | 68 | 30 |
| Tensile Strength (MPa) |  | 14 | 39 | 12 |
| Elongation (%) |  | 810 | 500 | 810 |
| Volume Resistivity Value (Ω · cm) |  | $1 \times 10^{13}$ or more | $1 \times 10^{14}$ or more | $1 \times 10^{11}$~$3 \times 10^{11}$ |
| Bleeding-out (after) | 24 hrs | ⊚ | ⊚ | ○ |
|  | 48 hrs | ⊚ | ⊚ | ○ |
|  | 120 hrs | ⊚ | ⊚ | Δ |
|  | 168 hrs | ⊚ | ⊚ | Δ |
| Coloring Properties |  | Good | Good | Good |

TABLE 20

|  | Comparative Example ||||
|---|---|---|---|---|
|  | 21 | 22 | 23 | 24 |
| Compounding Ratio (parts) |  |  |  |  |
| (A-2) Hardness D = 31 | 100 | 0 | 100 | 0 |
| (A-3) Hardness D = 68 | 0 | 100 | 0 | 100 |
| [(B-1) + (C-1)](20)*1 | 0 | 0 | 0 | 0 |
| (B)*2 | 0 | 0 | 0 | 0 |
| [(PN) + (P)](10) | 0 | 0 | 0 | 0 |
| (Q-1) | 0 | 0 | 3 | 3 |
| (R-3) | 20 | 25 | 0 | 0 |
| (J-3) PEEA | 0 | 0 | 0 | 0 |
| Results of Evaluation of Article Formed after Pelletizing |||||
| Hardness D | 41 | 80 | 30 | 67 |
| Tensile Strength (MPa) | 26 | 25 | 11 | 34 |
| Elongation (%) | 310 | 185 | 800 | 540 |
| Volume Resistivity Value (Ω · cm) | $4 \times 10^{7}$~$5 \times 10^{7}$ | $1 \times 10^{5}$~$2 \times 10^{5}$ | $1 \times 10^{12}$~$6 \times 10^{12}$ | $1 \times 10^{12}$~$5 \times 10^{12}$ |
| Bleeding-out (after) 24 hrs | ⊚ | ⊚ | Δ | Δ |
| 48 hrs | ⊚ | ⊚ | X | X |
| 120 hrs | ⊚ | ⊚ | X | X |
| 168 hrs | ⊚ | ⊚ | X | X |
| Coloring Properties | Bad only black | Bad only black | Good | Good |
| Others |  | Cracks were developed in an article in cold |  |  |

TABLE 21

|  | Comparative Example ||||
|---|---|---|---|---|
| Compounding Ratio (parts) | 25 | 26 | 27 | 28 |
| (D-2) Hardness D = 31 | 100 | 0 | 100 | 0 |
| (D-3) Hardness D = 68 | 0 | 100 | 0 | 100 |
| [(B-1) + (C-1)](20)*1 | 0 | 0 | 0 | 0 |
| (B)*2 | 0 | 0 | 0 | 0 |
| [(PN) + (P)](10) | 0 | 0 | 0 | 0 |
| (Q-1) | 0 | 0 | 3 | 3 |
| (R-3) | 20 | 25 | 0 | 0 |
| (J-3) PEEA | 10 | 10 | 20 | 20 |

TABLE 21-continued

| | Comparative Example | | | |
|---|---|---|---|---|
| Compounding Ratio (parts) | 25 | 26 | 27 | 28 |
| Results of Evaluation of Article Directly Formed by Dry Blending | | | | |
| Hardness D | — | — | 30 | 66 |
| Tensile Strength (MPa) | — | — | 11 | 31 |
| Elongation (%) | — | — | 800 | 520 |
| Volume Resistivity Value (Ω · cm) | — | — | $8 \times 10^{11} \sim 4 \times 10^{12}$ | $7 \times 10^{11} \sim 3 \times 10^{12}$ |
| Bleeding-out  24 hrs | — | — | Δ | Δ |
| (after)         48 hrs | — | — | X | X |
|                120 hrs | — | — | X | X |
|                168 hrs | — | — | X | X |
| Coloring Properties | | | Good | Good |
| Others | Unable to test because of impossibility of forming | Unable to test because of impossibility of forming | | |

*1[(B-1) + (C-1)] indicates "Sankonol 0862-20R" (trade name) described above.
*2(B) indicates lithium bis(trifluoromethanesulfonyl) imide, and numerals with brackets indicate the amount of component (B-1) contained in "Sankonol 0862-20R" (trade name).

2-1~2-3 Composition ((A)+(J)+(B)+(C), (A)+(B)+(J)+(C)+(K) and (A)+(J)+(B)+(K))

Various types of components used in examples and comparative examples were as follows:

Thermoplastic resin (A);

TOYOLAC 600 (trade name) (Tg: 80~90° C.) manufactured by Toray Industries, Inc., an ABS resin (elastic modulus in bending: 2,500 MPa), was used as (A-4).

Component (J);

PANDEXT-1190 (Tg: −40to −45° C.) manufactured by DAINIPPON INK & CHEMICALS INC., an adipate-based polyurethane, was used as polyurethane-based elastomer (J-1).

PEBAX 2533 (Tg: -60 to -70° C.) manufactured by Elf Atochem was used as polyamide-based elastomer (J-2).

Pelestat 6321 (Tg: −45 to −55° C.) manufactured by Sanyo Chemical Industries, Ltd. was used as polyetheresteramide (hereinafter also referred to as "PEEA" in the following tables) (J-3).

A polyether/polyester-based thermoplastic polyester elastomer (trade name: PELPRENE P-40B, hardness D=31, Tg: −60 to −70° C.) manufactured by TOYOBO CO., LTD. was used as polyether polyester-based elastomer (J-4).

BIONOLLE 3001 (Tg: −45° C.) manufactured by SHOW A HIGHPOLYMER CO., LTD. was used as aliphatic polyester-based resin (J-5). The above-mentioned hardness D was measured in accordance with ASTM D2240, and the unit is dimensionless.

(C-1); Bis[2-(2-butoxyethoxy)ethyl]adipate

Component (B-2); Lithium trifluoromethanesulfonate

Component (K);

Calcium silicate fiber (K-1) (average fiber diameter=1 to 10 μm, average fiber length=20 to 40 μm, trade name: "KEMOLIT S-3", manufactured by Tsuchiya Kaolin Industries, Ltd.)

Talc (K-2) (average particle size=7 μm, trade name: "Talc TT", manufactured by TAKEHARA CHEMICAL INDUSTRIAL CO., LTD.)

Mica (K-3) (average particle size=90 μm, trade name: "Suzorite Mica 200KI", manufactured by Kuraray Co., Ltd.)

Fillers used in comparative examples;

Glass fiber (T-1) (average fiber diameter=13 μm, average fiber length=3 mm, trade name: "Glass Fiber CS-3PE-291S", manufactured by Nitto Boseki Co., Ltd.)

Carbon fiber (T-2) [pitch-type carbon fiber (average fiber diameter=12 μm, average fiber length=3 mm), trade name: "Xylus GC-03J-415", manufactured by Osaka Gas Co., Ltd.]

EXAMPLES 62 TO 106 AND COMPARATIVE EXAMPLES 29 TO 72

Preparation of Compositions

According to each compounding formulation in the following tables from 22 to 33, (preliminary dry blending was conducted with a tumbler mixer, a 47 mm twin), while melt mixing thermoplastic resin (I), component (J) and components (B) and (C) by use of the extruder at 220° C., component (K) or another inorganic filler was cut out and put in a mixture in a melt state from a center portion of a barrel of the extruder by use of a metering feeder. After the putting, each strand-like melt mixture extruded from a die was cooled in a water bath, and passed through a cutter to prepare pellets of each antistatic composition.

Preparation of Test Pieces

Each test piece was molded from sample pellets with an injection molding machine of a mold clamping pressure of 80 tons/cm². For the molding conditions, the cylinder temperature was 220° C. and the mold temperature was 60° C.

Measurements of Physical Properties

After the test piece was controlled at 23±2° C. and a relative humidity of 50% RH for 24 hours, measurements of the following physical properties were made.

(1) Bending Strength (Elastic Modulus in Bending)

It was measured in accordance with ASTM D760. The unit in the following tables is MPa.

In the present invention, an elastic modulus in bending of 1,600 MPa or more was intended.

(2) Izod Impact Strength

It was measured in accordance with ASTM D256 using a ¼-inch thick test sample with a notch. The unit in the following tables is J/m.

In the present invention, an Izod impact strength of 25 J/m or more was intended.

(3) Surface Resistivity Value

Measurements were made with HIRESTA manufactured by Mitsubishi Chemical Corporation in accordance with ASTM D257 using an injection molded test piece with 6 (width)×6 (length)×0.3 (thickness) (cm).

In the present invention, a surface resistivity value of $10^{10}$ Ω/sq. or less was intended.

(4) Formability, Surface Smoothness and Dimensional Stability

Sample pellets were molded into a formed article with an injection molding machine of a mold clamping pressure of 220 tons/cm² at a cylinder temperature of 220° C. and a mold temperature of 60° C., using a mold having 11 gates with 13 (width)×32 (length)×0.3 (thickness) (cm). The state of the formed article was observed and evaluated as follows:

Formability

The formability (overall judgment of flowability, releasability, shortshot, breakage at a sprue end and the like) of the formed article was evaluated according the following criteria:

◉: Very good.
○: Formable.
Δ: Formable, but unable to conduct a stable forming operation.
X: Impossible to form.

Appearance of Formed Article

The overall judgment of flashing, weldmarks, flashmarks, shagginess and the like was evaluated according to the following criteria by visually observing the formed article:

◉: Very good.
○: Available.
Δ: Available for general-purpose parts, but unsuitable for precision parts.
X: Nonusable Other defects are described together in the tables.

Dimensional Stability

As for the evaluation of dimensional stability, there were visually evaluated warping, sink marks, deformation and the like which become problems as the form of the formed article.

Evaluation of Bleeding-out

A sample plate with 6 (width)×6 (length)×0.3 (cm) (thickness) was prepared by using a film gate, and allowed to stand at a temperature of 40° C. and a humidity of 90% for 7 days. The state during that period was visually observed, and evaluated based on the following criteria:

◉: The case that no bleeding was observed.
○: The case that the bleeding was slightly observed, but it was on a level of no problem for use.
Δ: The case that the bleeding was a little observed, and there was a bit of a problem for use.
X: The case that the bleeding was considerably observed to be nonusable.

TABLE 22

|  | Example | | | | | |
|---|---|---|---|---|---|---|
|  | 62 | 63 | 64 | 65 | 66 | 67 |
| Compounding Formulation (parts) | | | | | | |
| ABS Resin (A-4) | 90 | 90 | 90 | 85 | 80 | 75 |
| Polyurethane-Based (J-1) | 10 | 10 | 10 | 15 | 20 | 25 |
| Polyetherester-Based (J-4) | 0 | 0 | 0 | 0 | 0 | 0 |
| (A) + (J) | 100 | 100 | 100 | 100 | 100 | 100 |
| (C-1) | 1.0 | 1.0 | 1.0 | 1.0 | 1.0 | 1.0 |
| (B-2) | 0.2 | 0.2 | 0.2 | 0.2 | 0.2 | 0.2 |
| Calcium Silicate Fiber (K-1)*[4] | 5 | 10 | 20 | 10 | 10 | 10 |
| Talc (K-2)*[4] | 0 | 0 | 0 | 0 | 0 | 0 |
| Mica (K-3)*[4] | 0 | 0 | 0 | 0 | 0 | 0 |
| Results of Evaluation | | | | | | |
| Elastic Modulus in Bending (MPa) | 2,380 | 2,780 | 3,390 | 2,380 | 2,090 | 1,780 |
| Izod Impact Strength (J/m) | 50 | 40 | 35 | 32 | 32 | 42 |
| Surface Resistivity Value (Ω/sq.) | $10^9$ | $10^9$ | $10^9$ | $10^9$ | $10^8$ | $10^8$ |
| Formability | ◉ | ◉ | ○ | ◉ | ◉ | ◉ |
| Surface Smoothness | ◉ | ◉ | ◉ | ◉ | ◉ | ◉ |
| Dimensional Stability | ◉ | ◉ | ◉ | ◉ | ◉ | ◉ |
| Defects such as Warping, Sink Marks and Deformation | No defects | No defects | No defects | No defects | No defects | No defects |
| Bleeding-out | ◉ | ◉ | ◉ | ◉ | ◉ | ◉ |

|  | Example | | | | | |
|---|---|---|---|---|---|---|
|  | 68 | 69 | 70 | 71 | 72 | 73 |
| Compounding Formulation (parts) | | | | | | |
| ABS Resin (A-4) | 90 | 90 | 90 | 90 | 90 | 90 |
| Polyurethane-Based (J-1) | 10 | 10 | 10 | 0 | 0 | 0 |
| Polyetherester-Based (J-4) | 0 | 0 | 0 | 10 | 10 | 10 |
| (A) + (J) | 100 | 100 | 100 | 100 | 100 | 100 |
| (C-1) | 1.0 | 1.0 | 1.0 | 1.0 | 1.0 | 1.0 |
| (B-2) | 0.2 | 0.2 | 0.2 | 0.2 | 0.2 | 0.2 |
| Calcium Silicate Fiber (K-1)*[4] | 0 | 0 | 0 | 5 | 10 | 20 |
| Talc (K-2)*[4] | 10 | 0 | 20 | 0 | 0 | 0 |
| Mica (K-3)*[4] | 0 | 10 | 0 | 0 | 0 | 0 |
| Results of Evaluation | | | | | | |
| Elastic Modulus in Bending (MPa) | 2,180 | 2,180 | 2,480 | 2,480 | 2,810 | 3,420 |
| Izod Impact Strength (J/m) | 41 | 33 | 30 | 48 | 38 | 35 |
| Surface Resistivity Value (Ω/sq.) | $10^9$ | $10^9$ | $10^9$ | $10^9$ | $10^9$ | $10^9$ |
| Formability | ◉ | ○ | ○ | ◉ | ◉ | ○ |
| Surface Smoothness | ◉ | ○ | ◉ | ◉ | ◉ | ◉ |

TABLE 22-continued

| | | | | | | |
|---|---|---|---|---|---|---|
| Dimensional Stability | ○ | ○ | ○ | ◎ | ◎ | ◎ |
| Defects such as Warping, Sink Marks and Deformation | Slight warping | Slight warping | Slight warping | No defects | No defects | No defects |
| Bleeding-out | ◎ | ◎ | ◎ | ◎ | ◎ | ◎ |

TABLE 23

| | Example | | | | | |
|---|---|---|---|---|---|---|
| | 74 | 75 | 76 | 77 | 78 | 79 |
| Compounding Formulation (parts) | | | | | | |
| ABS Resin (A-4) | 85 | 80 | 75 | 90 | 90 | 90 |
| Polyetherester-Based (J-4) | 15 | 20 | 25 | 10 | 10 | 10 |
| Polyamide-Based (J-2) | 0 | 0 | 0 | 0 | 0 | 0 |
| (A) + (J) | 100 | 100 | 100 | 100 | 100 | 100 |
| (C-1) | 1.0 | 1.0 | 1.0 | 1.0 | 1.0 | 1.0 |
| (B-2) | 0.2 | 0.2 | 0.2 | 0.2 | 0.2 | 0.2 |
| Calcium Silicate Fiber (K-1)*4 | 10 | 10 | 10 | 0 | 0 | 0 |
| Talc (K-2)*4 | 0 | 0 | 0 | 10 | 0 | 20 |
| Mica (K-3)*4 | 0 | 0 | 0 | 0 | 10 | 0 |
| Results of Evaluation | | | | | | |
| Elastic Modulus in Bending (MPa) | 2,420 | 2,120 | 1,830 | 2,220 | 2,230 | 2,530 |
| Izod Impact Strength (J/m) | 32 | 34 | 40 | 38 | 35 | 35 |
| Surface Resistivity Value (Ω/sq.) | $10^9$ | $10^8$ | $10^8$ | $10^9$ | $10^9$ | $10^9$ |
| Formability | ◎ | ◎ | ◎ | ◎ | ○ | ○ |
| Surface Smoothness | ◎ | ◎ | ◎ | ◎ | ○ | ◎ |
| Dimensional Stability | ◎ | ◎ | ◎ | ○ | ○ | ○ |
| Defects such as Warping, Sink Marks and Deformation | No defects | No defects | No defects | Slight warping | Slight warping | Slight warping |
| Bleeding-out | ◎ | ◎ | ◎ | ◎ | ◎ | ◎ |

| | Example | | | | | |
|---|---|---|---|---|---|---|
| | 80 | 81 | 82 | 83 | 84 | 85 |
| Compounding Formulation (parts) | | | | | | |
| ABS Resin (A-4) | 90 | 90 | 90 | 85 | 80 | 75 |
| Polyetherester-Based (J-4) | 0 | 0 | 0 | 0 | 0 | 0 |
| Polyamide-Based (J-4) | 10 | 10 | 10 | 15 | 20 | 25 |
| (A) + (J) | 100 | 100 | 100 | 100 | 100 | 100 |
| (C-1) | 1.0 | 1.0 | 1.0 | 1.0 | 1.0 | 1.0 |
| (B-2) | 0.2 | 0.2 | 0.2 | 0.2 | 0.2 | 0.2 |
| Calcium Silicate Fiber (K-1)*4 | 5 | 10 | 20 | 10 | 10 | 10 |
| Talc (K-2)*4 | 0 | 0 | 0 | 0 | 0 | 0 |
| Mica (K-3)*4 | 0 | 0 | 0 | 0 | 0 | 0 |
| Results of Evaluation | | | | | | |
| Elastic Modulus in Bending (MPa) | 2,400 | 2,800 | 3,400 | 2,390 | 2,100 | 1,800 |
| Izod Impact Strength (J/m) | 50 | 36 | 33 | 38 | 40 | 42 |
| Surface Resistivity Value (Ω/sq.) | $10^9$ | $10^9$ | $10^9$ | $10^9$ | $10^8$ | $10^8$ |
| Formability | ◎ | ◎ | ○ | ◎ | ◎ | ◎ |
| Surface Smoothness | ◎ | ◎ | ◎ | ◎ | ◎ | ◎ |
| Dimensional Stability | ◎ | ◎ | ◎ | ◎ | ◎ | ◎ |
| Defects such as Warping, SinkMarks and Deformation | No defects | No defects | No defects | No defects | No defects | No defects |
| Bleeding-out | ◎ | ◎ | ◎ | ◎ | ◎ | ◎ |

TABLE 24

| | Example | | | | | |
|---|---|---|---|---|---|---|
| | 86 | 87 | 88 | 89 | 90 | 91 |
| Compounding Formulation (parts) | | | | | | |
| ABS Resin (A-4) | 90 | 90 | 90 | 90 | 90 | 90 |
| Polyamide-Based (J-2) | 10 | 10 | 10 | 0 | 0 | 0 |
| Polyester-Based (J-5) | 0 | 0 | 0 | 10 | 10 | 10 |
| (A) + (J) | 100 | 100 | 100 | 100 | 100 | 100 |
| (C-1) | 1.0 | 1.0 | 1.0 | 1.0 | 1.0 | 1.0 |
| (B-2) | 0.2 | 0.2 | 0.2 | 0.2 | 0.2 | 0.2 |

TABLE 24-continued

|  | | | | | | |
|---|---|---|---|---|---|---|
| Calcium Silicate Fiber (K-1)*4 | 0 | 0 | 0 | 5 | 10 | 20 |
| Talc (K-2)*4 | 10 | 0 | 20 | 0 | 0 | 0 |
| Mica (K-3)*4 | 0 | 10 | 0 | 0 | 0 | 0 |
| Results of Evaluation | | | | | | |
| Elastic Modulus in Bending (MPa) | 2,200 | 2,190 | 2,490 | 2,500 | 2,830 | 3,450 |
| Izod Impact Strength (J/m) | 41 | 33 | 30 | 44 | 35 | 32 |
| Surface Resistivity Value (Ω/sq.) | $10^9$ | $10^9$ | $10^9$ | $10^9$ | $10^9$ | $10^9$ |
| Formability | ⊚ | ○ | ○ | ⊚ | ⊚ | ○ |
| Surface Smoothness | ⊚ | ○ | ⊚ | ⊚ | ⊚ | ⊚ |
| Dimensional Stability | ○ | ○ | ○ | ⊚ | ⊚ | ⊚ |
| Defects such as Warping, Sink Marks and Deformation | Slight warping | Slight warping | Slight warping | No defects | No defects | No defects |
| Bleeding-out | ⊚ | ⊚ | ⊚ | ⊚ | ⊚ | ⊚ |

| | Example | | | | | |
|---|---|---|---|---|---|---|
| | 92 | 93 | 94 | 95 | 96 | 97 |
| Compounding Formulation (parts) | | | | | | |
| ABS Resin (A-4) | 85 | 80 | 75 | 90 | 90 | 90 |
| Polyamide-Based (J-2) | 0 | 0 | 0 | 0 | 0 | 0 |
| Polyester-Based (J-5) | 15 | 20 | 25 | 10 | 10 | 10 |
| (A) + (J) | 100 | 100 | 100 | 100 | 100 | 100 |
| (C-1) | 1.0 | 1.0 | 1.0 | 1.0 | 1.0 | 1.0 |
| (B-2) | 0.2 | 0.2 | 0.2 | 0.2 | 0.2 | 0.2 |
| Calcium Silicate Fiber (K-1)*4 | 10 | 10 | 10 | 0 | 0 | 0 |
| Talc (K-2)*4 | 0 | 0 | 0 | 10 | 0 | 20 |
| Mica (K-3)*4 | 0 | 0 | 0 | 0 | 10 | 0 |
| Results of Evaluation | | | | | | |
| Elastic Modulus in Bending (MPa) | 2,480 | 2,180 | 1,880 | 2,290 | 2,300 | 2,600 |
| Izod Impact Strength (J/m) | 30 | 34 | 37 | 34 | 31 | 30 |
| Surface Resistivity Value (Ω/sq.) | $10^9$ | $10^8$ | $10^8$ | $10^9$ | $10^9$ | $10^9$ |
| Formability | ⊚ | ⊚ | ⊚ | ⊚ | ○ | ○ |
| Surface Smoothness | ⊚ | ⊚ | ⊚ | ⊚ | ○ | ⊚ |
| Dimensional Stability | ⊚ | ⊚ | ⊚ | ○ | ○ | ○ |
| Defects such as Warping, Sink Marks and Deformation | No defects | No defects | No defects | Slight warping | Slight warping | Slight warping |
| Bleeding-out | ⊚ | ⊚ | ⊚ | ⊚ | ⊚ | ⊚ |

TABLE 25

| | Example | | | | | | | | |
|---|---|---|---|---|---|---|---|---|---|
| | 98 | 99 | 100 | 101 | 102 | 103 | 104 | 105 | 106 |
| Compounding Formulation (parts) | | | | | | | | | |
| ABS Resin (A-4) | | | | | | | | | |
| Polyamide-Based (J-2) | 90 | 90 | 90 | 85 | 80 | 75 | 90 | 90 | 90 |
| PEEA-Based (J-3) | 10 | 10 | 10 | 10 | 10 | 10 | 10 | 10 | 10 |
| (A) + (J) | 100 | 100 | 100 | 100 | 100 | 100 | 100 | 100 | 100 |
| (C-1) | 1.0 | 1.0 | 1.0 | 1.0 | 1.0 | 1.0 | 1.0 | 1.0 | 1.0 |
| (B-2) | 0.2 | 0.2 | 0.2 | 0.2 | 0.2 | 0.2 | 0.2 | 0.2 | 0.2 |
| Calcium Silicate Fiber (K-1)*4 | 5 | 10 | 20 | 10 | 10 | 10 | 0 | 0 | 5 |
| Talc (K-2)*4 | 0 | 0 | 0 | 0 | 0 | 0 | 10 | 0 | 20 |
| Mica (K-3)*4 | 0 | 0 | 0 | 0 | 0 | 0 | 0 | 10 | 0 |
| Results of Evaluation | | | | | | | | | |
| Elastic Modulus in Bending (MPa) | 2450 | 2800 | 3400 | 2400 | 2100 | 1800 | 2200 | 2200 | 2500 |
| Izod Impact Strength (J/m) | 43 | 32 | 29 | 30 | 30 | 30 | 35 | 29 | 30 |
| Surface Resistivity Value (Ω/sq.) | $10^9$ | $10^9$ | $10^9$ | $10^9$ | $10^8$ | $10^8$ | $10^9$ | $10^9$ | $10^9$ |
| Formability | ⊚ | ⊚ | ⊚ | ⊚ | ⊚ | ⊚ | ○ | ○ | ○ |
| Surface Smoothness | ⊚ | ⊚ | ⊚ | ⊚ | ⊚ | ⊚ | ○ | ○ | ○ |
| Dimensional Stability | ⊚ | ⊚ | ⊚ | ⊚ | ⊚ | ⊚ | ○ | ○ | ⊚ |
| Defects such as Warping, Sink Marks and Deformation | No defects | No defects | No defects | No defects | No defects | No defects | Slight warping | Slight warping | Slight warping |
| Bleeding-out | ⊚ | ⊚ | ⊚ | ⊚ | ⊚ | ⊚ | ⊚ | ⊚ | ⊚ |

TABLE 26

|  | Comparative Example | | | | |
|---|---|---|---|---|---|
|  | 29 | 30 | 31 | 32 | 33 |
| Compounding Formulation (parts) | | | | | |
| ABS Resin (A-4) | 90 | 85 | 80 | 75 | 75 |
| Polyurethane-Based (J-1) | 10 | 15 | 20 | 25 | 10 |
| (A) + (J) | 100 | 100 | 100 | 100 | 100 |
| (C-1) | 0 | 0 | 0 | 0 | 0 |
| (B-2) | 0.2 | 0.2 | 0.2 | 0.2 | 0 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 1,920 | 1,840 | 1,540 | 1,650 | 1,950 |
| Izod Impact Strength (J/m) | 52 | 40 | 40 | 40 | 50 |
| Surface Resistivity Value (Ω/sq.) | $10^{12}$ | $10^{11}$ | $10^{10}$ | $10^{9}$ | $10^{12}$ |
| Formability | ◎ | ◎ | ◎ | ◎ | ◎ |
| Surface Smoothness | ◎ | ◎ | ◎ | ◎ | ◎ |
| Dimensional Stability | ○ | Δ | X | X | ○ |
| Defects such as Warping, Sink Marks and Deformation | Slight sink marks | Sink marks, warping | Sink marks, warping, deformation | Sink marks, warping, deformation | Slight sink marks |
| Bleeding-out | ◎ | ◎ | ◎ | ◎ | ◎ |

|  | Comparative Example | | | | |
|---|---|---|---|---|---|
|  | 34 | 35 | 36 | 37 | 38 |
| Compounding Formulation (parts) | | | | | |
| ABS Resin (A-4) | 75 | 90 | 85 | 80 | 75 |
| Polyurethane-Based (J-1) | 25 | 10 | 15 | 20 | 25 |
| (A) + (J) | 100 | 100 | 100 | 100 | 100 |
| (C-1) | 0 | 1.0 | 1.0 | 1.0 | 1.0 |
| (B-2) | 0 | 0.2 | 0.2 | 0.2 | 0.2 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 1,360 | 2,080 | 1,880 | 1,720 | 1,580 |
| Izod Impact Strength (J/m) | 41 | 32 | 35 | 42 | 45 |
| Surface Resistivity Value (Ω/sq.) | $10^{10}$ | $10^{9}$ | $10^{9}$ | $10^{8}$ | $10^{8}$ |
| Formability | ◎ | ◎ | ◎ | ◎ | ◎ |
| Surface Smoothness | ◎ | ◎ | ◎ | ◎ | ◎ |
| Dimensional Stability | X | Δ | X | X | X |
| Defects such as Warping, Sink Marks and Deformation | Sink marks, warping, deformation | Sink marks | Sink marks, warping, deformation | Sink marks, warping, deformation | Sink marks, warping, deformation |
| Bleeding-out | ◎ | ◎ | ◎ | ◎ | ◎ |

TABLE 27

|  | Comparative Example | | | | |
|---|---|---|---|---|---|
|  | 39 | 40 | 41 | 42 | 43 |
| Compounding Formulation (parts) | | | | | |
| ABS Resin (A-4) | 90 | 85 | 80 | 75 | 90 |
| Polyurethane-Based (J-1) | 0 | 0 | 0 | 0 | 0 |
| Polyetherester-Based (J-4) | 10 | 15 | 20 | 25 | 10 |
| (A) + (J) | 100 | 100 | 100 | 100 | 100 |
| (C-1) | 0 | 0 | 0 | 0 | 0 |
| (B-2) | 0.2 | 0.2 | 0.2 | 0.2 | 0 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 2,100 | 1,950 | 1,680 | 1,780 | 2,100 |
| Izod Impact Strength (J/m) | 45 | 38 | 40 | 41 | 49 |
| Surface Resistivity Value (Ω/sq.) | $10^{12}$ | $10^{11}$ | $10^{10}$ | $10^{9}$ | $10^{13}$ |
| Formability | ◎ | ◎ | ◎ | ◎ | ◎ |

TABLE 27-continued

|  | | | | | |
|---|---|---|---|---|---|
| Surface Smoothness | ◎ | ◎ | ◎ | ◎ | ◎ |
| Dimensional Stability | ○ | Δ | X | X | ○ |
| Defects such as Warping, Sink Marks and Deformation | Slight sink marks | Sink marks, warping | Sink marks, warping, deformation | Sink marks, warping, deformation | Slight sink marks |
| Bleeding-out | ◎ | ◎ | ◎ | ◎ | ◎ |

|  | Comparative Example | | |
|---|---|---|---|
|  | 44 | 45 | 46 |
| Compounding Formulation (parts) | | | |
| ABS Resin (A-4) | 75 | 90 | 85 |
| Polyurethane-Based (J-1) | 0 | 0 | 0 |
| Polyetherester-Based (J-4) | 25 | 10 | 15 |
| (A) + (J) | 100 | 100 | 100 |
| (C-1) | 0 | 1.0 | 1.0 |
| (B-2) | 0 | 0.2 | 0.2 |
| Calcium Silicate Fiber (K-1)*4 | 0 | 0 | 0 |
| Glass Fiber (T-1)*4 | 0 | 0 | 0 |
| Carbon Fiber (T-2)*4 | 0 | 0 | 0 |
| Results of Evaluation | | | |
| Elastic Modulus in Bending (MPa) | 1,480 | 2,120 | 1,980 |
| Izod Impact Strength (J/m) | 39 | 33 | 35 |
| Surface Resistivity Value (Ω/sq.) | $10^{11}$ | $10^{9}$ | $10^{9}$ |
| Formability | ◎ | ◎ | ◎ |
| Surface Smoothness | ◎ | ◎ | ◎ |
| Dimensional Stability | X | Δ | X |
| Defects such as Warping, Sink Marks and Deformation | Sink marks, warp-ing, deformation | Sink marks | Sink marks, warp-ing, deformation |
| Bleeding-out | ◎ | ◎ | ◎ |

TABLE 28

|  | Comparative Example | | | | |
|---|---|---|---|---|---|
|  | 47 | 48 | 49 | 50 | 51 |
| Compounding Formulation (parts) | | | | | |
| ABS Resin (A-4) | 80 | 75 | 90 | 85 | 80 |
| Polyetherester-Based (J-4) | 20 | 25 | 0 | 0 | 0 |
| Polyamide-Based (J-2) | 0 | 0 | 10 | 15 | 20 |
| (A) + (J) | 100 | 100 | 100 | 100 | 100 |
| (C-1) | 1.0 | 1.0 | 0 | 0 | 0 |
| (B-2) | 0.2 | 0.2 | 0.2 | 0.2 | 0.2 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation | | | | | |
| Elastic Modulus in Bending (MPa) | 1,780 | 1,680 | 1,980 | 1,890 | 1,590 |
| Izod Impact Strength (J/m) | 37 | 38 | 45 | 37 | 36 |
| Surface Resistivity Value (Ω/sq.) | $10^{8}$ | $10^{8}$ | $10^{12}$ | $10^{11}$ | $10^{10}$ |
| Formability | ◎ | ◎ | ◎ | ◎ | ◎ |
| Surface Smoothness | ◎ | ◎ | ◎ | ◎ | ◎ |
| Dimensional Stability | X | X | ○ | Δ | X |
| Defects such as Warping, Sink Marks and Deformation | Sink marks, warping, deformation | Sink marks, warping, deformation | Slight sink marks | Sink marks, warping | Sink marks, warping, deformation |
| Bleeding-out | ◎ | ◎ | ◎ | ◎ | ◎ |

|  | Comparative Example | | |
|---|---|---|---|
|  | 52 | 53 | 54 |
| Compounding Formulation (parts) | | | |
| ABS Resin (A-4) | 75 | 90 | 75 |
| Polyetherester-Based (J-4) | 0 | 0 | 0 |
| Polyamide-Based (J-2) | 25 | 10 | 25 |
| (A) + (J) | 100 | 100 | 100 |
| (C-1) | 0 | 0 | 0 |
| (B-2) | 0.2 | 0 | 0 |

TABLE 28-continued

|  |  |  |  |
|---|---|---|---|
| Calcium Silicate Fiber (K-1)*4 | 0 | 0 | 0 |
| Glass Fiber (T-1)*4 | 0 | 0 | 0 |
| Carbon Fiber (T-2)*4 | 0 | 0 | 0 |
| Results of Evaluation |  |  |  |
| Elastic Modulus in Bending (MPa) | 1,700 | 2,000 | 1,390 |
| Izod Impact Strength (J/m) | 36 | 48 | 38 |
| Surface Resistivity Value (Ω/sq.) | $10^9$ | $10^{13}$ | $10^{11}$ |
| Formability | ⊚ | ⊚ | ⊚ |
| Surface Smoothness | ⊚ | ⊚ | ⊚ |
| Dimensional Stability | X | ◯ | X |
| Defects such as Warping, Sink Marks and Deformation | Sink marks, warp-ing, deformation | Slight sink marks | Sink marks, warp-ing, deformation |
| Bleeding-out | ⊚ | ⊚ | ⊚ |

TABLE 29

|  | Comparative Example ||||| 
|---|---|---|---|---|---|
|  | 55 | 56 | 57 | 58 | 59 |
| Compounding Formulation (parts) |  |  |  |  |  |
| ABS Resin (A-4) | 90 | 85 | 80 | 75 | 90 |
| Polyamide-Based (J-2) | 10 | 15 | 20 | 25 | 0 |
| Polyester-Based (J-5) | 0 | 0 | 0 | 0 | 10 |
| (A) + (J) | 100 | 100 | 100 | 100 | 100 |
| (C-1) | 1.0 | 1.0 | 1.0 | 1.0 | 0 |
| (B-2) | 0.2 | 0.2 | 0.2 | 0.2 | 0.2 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation |  |  |  |  |  |
| Elastic Modulus in Bending (MPa) | 2,090 | 1,890 | 1,740 | 1,600 | 2,100 |
| Izod Impact Strength (J/m) | 32 | 32 | 32 | 32 | 44 |
| Surface Resistivity Value (Ω/sq.) | $10^9$ | $10^9$ | $10^8$ | $10^8$ | $10^{12}$ |
| Formability | ⊚ | ⊚ | ⊚ | ⊚ | ⊚ |
| Surface Smoothness | ⊚ | ⊚ | ⊚ | ⊚ | ⊚ |
| Dimensional Stability | Δ | X | X | X | ◯ |
| Defects such as Warping, Sink Marks and Deformation | Sink marks | Sink marks, warping, deformation | Sink marks, warping, deformation | Sink marks, warping, deformation | Slight sink marks |
| Bleeding-out | ⊚ | ⊚ | ⊚ | ⊚ | ⊚ |

|  | Comparative Example ||||| 
|---|---|---|---|---|---|
|  | 60 | 61 | 62 | 63 | 64 |
| Compounding Formulation (parts) |  |  |  |  |  |
| ABS Resin (A-4) | 85 | 80 | 75 | 90 | 75 |
| Polyamide-Based (J-2) | 0 | 0 | 0 | 0 | 0 |
| Polyester-Based (J-5) | 15 | 20 | 25 | 10 | 25 |
| (A) + (J) | 100 | 100 | 100 | 100 | 100 |
| (C-1) | 0 | 0 | 0 | 0 | 0 |
| (B-2) | 0.2 | 0.2 | 0.2 | 0 | 0 |
| Calcium Silicate Fiber (K-1)*4 | 0 | 0 | 0 | 0 | 0 |
| Glass Fiber (T-1)*4 | 0 | 0 | 0 | 0 | 0 |
| Carbon Fiber (T-2)*4 | 0 | 0 | 0 | 0 | 0 |
| Results of Evaluation |  |  |  |  |  |
| Elastic Modulus in Bending (MPa) | 1,980 | 1,700 | 1,780 | 2,100 | 1,500 |
| Izod Impact Strength (J/m) | 36 | 36 | 35 | 45 | 36 |
| Surface Resistivity Value (Ω/sq.) | $10^{11}$ | $10^{10}$ | $10^9$ | $10^{13}$ | $10^{11}$ |
| Formability | ⊚ | ⊚ | ⊚ | ⊚ | ⊚ |
| Surface Smoothness | ⊚ | ⊚ | ⊚ | ⊚ | ⊚ |
| Dimensional Stability | Δ | X | X | ◯ | X |
| Defects such as Warping, Sink Marks and Deformation | Sink marks, warping | Sink marks, warping, deformation | Sink marks, warping, deformation | Slight sink marks | Sink marks, warping, deformation |
| Bleeding-out | ⊚ | ⊚ | ⊚ | ⊚ | ⊚ |

TABLE 30

| | Comparative Example | | | |
|---|---|---|---|---|
| | 65 | 66 | 67 | 68 |
| Compounding Formulation (parts) | | | | |
| ABS Resin (A-4) | 90 | 85 | 80 | 75 |
| Polyester-Based (J-5) | 10 | 15 | 20 | 25 |
| (A) + (J) | 100 | 100 | 100 | 100 |
| (C-1) | 1.0 | 1.0 | 1.0 | 1.0 |
| (B-2) | 0.2 | 0.2 | 0.2 | 0.2 |
| Calcium Silicate Fiber (K-1)*[4] | 0 | 0 | 0 | 0 |
| Glass Fiber (T-1)*[4] | 0 | 0 | 0 | 0 |
| Carbon Fiber (T-2)*[4] | 0 | 0 | 0 | 0 |
| Results of Evaluation | | | | |
| Elastic Modulus in Bending (MPa) | 2,180 | 1,980 | 1,800 | 1,700 |
| Izod Impact Strength (J/m) | 30 | 31 | 32 | 30 |
| Surface Resistivity Value (Ω/sq.) | $10^9$ | $10^9$ | $10^9$ | $10^8$ |
| Formability | ⊚ | ⊚ | ⊚ | ⊚ |
| Surface Smoothness | ⊚ | ⊚ | ⊚ | ⊚ |
| Dimensional Stability | Δ | X | X | X |
| Defects such as Warping, Sink Marks and Deformation | Sink marks | Sink marks, warping, deformation | Sink marks, warping, deformation | Sink marks, warping, deformation |
| Bleeding-out | ⊚ | ⊚ | ⊚ | ⊚ |

TABLE 31

| | Comparative Example | | | |
|---|---|---|---|---|
| | 69 | 70 | 71 | 72 |
| Compounding Formulation (parts) | | | | |
| ABS Resin (A-4) | 90 | 85 | 80 | 75 |
| PEEA-Based (J-3) | 10 | 15 | 20 | 25 |
| (A) + (J) | 100 | 100 | 100 | 100 |
| (C-1) | 1.0 | 1.0 | 1.0 | 1.0 |
| (B-2) | 0.2 | 0.2 | 0.2 | 0.2 |
| Calcium Silicate Fiber (K-1)*[4] | 0 | 0 | 0 | 0 |
| Glass Fiber (T-1)*[4] | 0 | 0 | 0 | 0 |
| Carbon Fiber (T-2)*[4] | 0 | 0 | 0 | 0 |
| Results of Evaluation | | | | |
| Elastic Modulus in Bending (MPa) | 2,100 | 1,900 | 1,750 | 1,600 |
| Izod Impact Strength (J/m) | 29 | 30 | 30 | 30 |
| Surface Resistivity Value (Ω/sq.) | $10^9$ | $10^9$ | $10^9$ | $10^8$ |
| Formability | ⊚ | ⊚ | ⊚ | ⊚ |
| Surface Smoothness | ⊚ | ⊚ | ⊚ | ⊚ |
| Dimensional Stability | | | | |
| Defects such as Warping, Sink Marks and Deformation | Sink marks | Sink marks, warping, deformation | Sink marks, warping, deformation | Sink marks, warping, deformation |
| Bleeding-out | ⊚ | ⊚ | ⊚ | ⊚ |

In the above tables, * is as follows.
*[4]Parts based on 100 parts of the total of components (A) to (K)

Third Composition ((L)+(B)+(J))

Various types of components used in examples and comparative examples of third to 3-3 compositions were as follows:

Component (L);

Acrylonitrile butadiene rubber (NBR) (trade name: N520 (containing 40% of acrylonitrile), manufactured by JSR Corporation, Tg: −25° C.) was used as polymer (L-1).

Chloroprene rubber (CR) (trade name: M-41, manufactured by DENKI KAGAKU KOGYO KABUSHIKI KAISHA, Tg: −51° C.) was used as polymer (L-2).

Acrylic rubber (ANM) (trade name: AR201, manufactured by JSR Corporation, Tg: −41° C) was used as polymer (L-3).

Component (B);

(B-1); Lithium bis(trifluoromethanesulfonyl)imide
(B-2); Lithium trifluoromethanesulfonate
(B-3); Lithium tris(trifluoromethanesulfonyl)methide Component (J);

Pelestat 6321 (Tg: −45 to −55° C.) manufactured by Sanyo Chemical Industries, Ltd. was used as polyetheresteramide (J-3).

EXAMPLES 107 TO 111

Preparation of Compositions

According to each compounding formulation in the following table 32, composition was prepared by adding component (B) to component (J) and kneading and further adding component (L) thereto and kneaded by roll (170° C.).

Preparation of Test Pieces

The rubber-like composition prepared by roll kneading was placed in stainless-steel mold form (10 cm×10 cm), and sheet was prepared by compression machine (20 kg/cm$^2$, 90° C.)

Measurements of Physical Properties

Measurements of physical properties of third to 3-3 compositions were made as follows:

(1) Surface Resistivity Value

Measurements were made with HIRESTA manufactured by Mitsubishi Chemical Corporation in accordance with ASTM D257 using an injection molded test piece with 6 (width)×6 (length)×0.3 (thickness) (cm).

In the present invention, a surface resistivity value of $10^{10}$ Ω/sq. or less was intended.

(2) Bleeding-Out

Evaluation of Bleeding-out

A sample sheet with 5 cm (width)×5 cm (length)×2.5 cm (thickness) was prepared, and allowed to stand at a temperature of 40° C. and a humidity of 90% for 7 days. The state during that period was visually observed, and evaluated based on the following criteria:

⊚: The case that no bleeding was observed.

○: The case that the bleeding was slightly observed, but it was on a level of no problem for use.

Δ: The case that the bleeding was a little observed, and there was a bit of a problem for use.

X: The case that the bleeding was considerably observed to be nonusable.

The results are shown in the following table 32.

TABLE 32

| | Examples | | | | |
|---|---|---|---|---|---|
| | 107 | 108 | 109 | 110 | 111 |
| Compounding Ratio (parts) | | | | | |
| Rubber(L); Kind | NBR | NBR | NBR | CR | ANM |
| Amount | 100 | 100 | 100 | 100 | 100 |
| Component (B); Kind lithium bis (trifluoromethanesulfonyl) imide | | | | | |
| Amount | 1.0 | 0.5 | 5.0 | 0.5 | 1.7 |
| Component (J); (J-3) PEEA | 7.5 | 10 | 23 | 3 | 10 |
| Results of Evaluation | | | | | |
| Surface Resistivity Value (Ω/sq.) | $1 \times 10^9$ | $2 \times 10^9$ | $2 \times 10^7$ | $1 \times 10^8$ | $1 \times 10^7$ |
| Bleeding-out | ⊚ | ⊚ | ⊚ | ⊚ | ⊚ |

3-1 Composition ((L)+(B)+(J)+(C))

EXAMPLES 112 TO 116

3 Parts of zinc oxide, 1 part of stearic acid, 75 parts of silica white, 10 parts of each of solutions (X-2) to (X-5) of the following table 33 and 3 to 7.5 parts by weight of (J-3) polyetheresteramide were compounded with 100 parts of (L-1) acrylonitrile butadiene rubber (NBR) or (L-2) chloroprene ruber (CR), followed by kneading with rolls. Then, 2 parts of sulfur and 2 parts of avulcanization accelerator were added, followed by further kneading with rolls. The kneaded product was formed with a press at 160° C. to prepare a 1 mm thick sheet. In examples and comparative examples, tetraethylthiuram sulfide (TMTD), NOCCELER-TT (trade name) manufactured by OUCHI SHINKO CHEMICAL INDUSTRIAL CO., Ltd., was used as the vulcanization accelerator.

REFERENCE EXAMPLES 1 TO 4

(C-1) Bis[2-(2-butoxyethoxy)ethyl]adipate and (C-5) bis (2-butoxyethyl)phthalate were used as component (C)

(B-1) To (B-5) were added to component (C) and mixed it for 66° C. for 1.5 hours, then solution (X-2) to (X-5) were obtained.

TABLE 33

| | Reference Example | | | |
|---|---|---|---|---|
| | 1 | 2 | 3 | 4 |
| | Solution | | | |
| | X-2 | X-3 | X-4 | X-5 |
| Component (B); | — | — | — | — |
| Lithium trifluoromethanesulfonate (B-2) | — | — | — | — |
| Lithium bis (trifluoromethanesulfonyl) imide (B-1) | 15 | — | 15 | — |
| Lithium tris(trifluoromethanesulfonyl) methide (B-3) | — | 25 | — | — |
| | — | — | — | 10 |
| Component (C); | | | | |
| Bis[2-(2-butoxyethoxy)ethyl] adipate (C-1) | 85 | 75 | 25.5 | 90 |
| Bis(2-butoxyethyl) phthalate (C-5) | — | — | 59.5 | — |

TABLE 34

| | Examples | | | | |
|---|---|---|---|---|---|
| | 112 | 113 | 114 | 115 | 116 |
| Compounding Ratio (parts) | | | | | |
| Rubber(L); Kind | NBR | NBR | NBR | NBR | CR |
| Amount | 100 | 100 | 100 | 100 | 100 |
| Solution[Component(C) + Component(B)]; | | | | | |
| Kind | X-2 | X-3 | X-4 | X-5 | X-5 |
| Amount | 10 | 10 | 10 | 10 | 10 |
| Component (J); | | | | | |
| (J-3) PEEA | 7.5 | 3 | 5 | 5 | 3 |

TABLE 34-continued

|  | Examples | | | | |
| --- | --- | --- | --- | --- | --- |
|  | 112 | 113 | 114 | 115 | 116 |
| Results of Evaluation | | | | | |
| Surface Resistivity value (Ω/sq.) | $10^9$ | $10^8$~$10^9$ | $10^9$ | $10^9$ | $10^9$ |
| Bleeding-out | ◎ | ◎ | ◎ | ◎ | ◎ |

3-2 Composition ((L)+(B)+(J)+(C)+(K))

EXAMPLES 117 TO 120

5 Parts of zinc oxide, 1 part of stearic acid, 65 parts of silica white, 10 parts of naphthenic process oil, 5 and 10 parts of each of solutions X-3 and X-4 of the above table respectively, 7 to 20 parts (J-3) PEEA and calcium silicate fiber (K-1) were compounded with 100 parts of chloroprene rubber (CR) (L-2) or acrylic rubber (ANM) (L-3), followed by kneading with rolls. Then, 2 parts of sulfur and 2 parts of a vulcanization accelerator were added, followed by further kneading with rolls. The kneaded product was formed with a press at 160° C. to prepare a 1 mm thick sheet.
Component (K);
Calcium silicate fiber (K-1) (average fiber diameter=1 to 10 μm, average fiber length=20 to 40 μm, trade name: "KEMOLIT S-3", manufactured by Tsuchiya Kaolin Industries, Ltd.).

TABLE 35

|  | Examples | | | |
| --- | --- | --- | --- | --- |
|  | 117 | 118 | 119 | 120 |
| Compounding Ratio (parts) | | | | |
| Rubber(L); Kind | CR | CR | ANM | ANM |
| Amount | 100 | 100 | 100 | 100 |
| Solution [Component (C) + Component (B)]; Kind | X-3 | X-4 | X-3 | X-4 |
| Amount | 10 | 5 | 10 | 10 |
| Component (J); (J-3) PEEA | 12 | 20 | 7 | 15 |
| Component (K); (K-1) Calcium silicate fiber | 5 | 5 | 5 | 5 |
| Results of Evaluation | | | | |
| Surface Resistivity value (Ω/sq.) | $10^8$-$10^9$ | $10^9$ | $10^8$-$10^9$ | $10^9$ |
| Bleeding-out | ◎ | ◎ | ◎ | ◎ |

3-3 Composition ((L)+(B)+(J)+(K))

EXAMPLES 121 TO 125

5 Parts of zinc oxide, 6 part of stearic acid, 65 parts of silica white, 10 parts of naphthenic process oil and, 0.5 or 1 parts of (B-1) and 5 parts of calcium silicate fiber (K-1) were compounded with 100 parts of chloroprene rubber (CR) (L-2) or acrylic rubber (ANM) (L-3), followed by kneading with rolls. Then, 2 parts of sulfur and 2 parts of a vulcanization accelerator were added, followed by further kneading with rolls. The kneaded product was formed with a press at 170° C. to prepare a 1 mm thick sheet.
Component (K);
Calcium silicate fiber (K-1) (average fiber diameter=1 to 10 μm, average fiber length=20 to 40 μm, trade name: "KEMOLIT S-3", manufactured by Tsuchiya Kaolin Industries, Ltd.)

TABLE 36

|  | Examples | | | | |
| --- | --- | --- | --- | --- | --- |
|  | 121 | 122 | 123 | 124 | 125 |
| Compounding Ratio (parts) | | | | | |
| Rubber(L); Kind | NBR | NBR | NBR | NBR | NBR |
| Amount | 100 | 100 | 100 | 100 | 100 |
| Component (B); Kind lithium bis(trifluoromethanesulfonyl)imide Amount | 0.5 | 1.0 | 1.0 | 1.0 | 1.0 |
| Component (J); (J-3) PEEA | 15 | 10 | 15 | 30 | 30 |
| Component (K); (K-1) Calcium silicate fiber | 5 | 5 | 5 | 5 | 10 |
| Results of Evaluation | | | | | |
| Surface Resistivity value (Ω/sq.) | $10^9$ | $10^9$ | $10^{8-9}$ | $10^8$ | $10^8$ |
| Bleeding-out | ◎ | ◎ | ◎ | ◎ | ◎ |

COMPARATIVE EXAMPLE 73

A 1 mm thick sheet was prepared in the same manner as with Example 122 with the exception that (J-3) PEEA was not used.

COMPARATIVE EXAMPLE 74

A 1 mm thick sheet was prepared in the same manner as with Example 119 with the exception that (J-3) PEEA was not used.

COMPARATIVE EXAMPLE 75

A 1 mm thick sheet was prepared in the same manner as with Example 118 with the exception that (J-3) PEEA was not used.

COMPARATIVE EXAMPLE 76

A 1 mm thick sheet was prepared in the same manner as with Example 115 with the exception that (J-3) PEEA was not used.

COMPARATIVE EXAMPLE 77

A 1 mm thick sheet was prepared in the same manner as with Example 116 with the exception that (J-3) PEEA was not used.
Evaluation of Rubber Compositions
The surface resistivity value (JIS K6723) of the sheets prepared in examples 112 to 115 was as very low as $10^8$ to $10^9$ Ω/sq., and the occurrence of the bleeding-out was not observed. In contrast, as for the rubber compositions using no (J-3) PEEA prepared in Comparative Examples 73 to 74, the surface resistivity value was from $10^{14}$ to $10^5$ Ω/sq., and the antistatic properties were not observed. Further, although the surface resistivity value of the sheet prepared in Comparative Example 77 was from $10^8$ to $10^9$ Ω/sq., the occurrence of the bleeding-out was much observed. Results are shown in the following table 37.

As for the coloring properties of the rubber compositions of Examples 107 to 125, the compositions visually showed a white color as a result of coloring with silica white, so that coloring was possible. On the other hand, Comparative Examples 73 to 76 showed a white color, so that coloring was possible. However, they were unfit for practical use with respect to the antistatic function.

TABLE 37

| | Comparative Examples | | | | |
|---|---|---|---|---|---|
| | 73 | 74 | 75 | 76 | 77 |
| Compounding Ratio (parts) | | | | | |
| Rubber(L); | | | | | |
| Kind | NBR | ANM | CR | NBR | CR |
| Amount | 100 | 100 | 100 | 100 | 100 |
| Solution [Component (C) + Component (B)]; | | | | | |
| Kind | X-3 | X-4 | X-4 | X-5 | X-5 |
| Amount | 10 | 10 | 5 | 10 | 10 |
| Component (J); | | | | | |
| (J-3) PEEA | 0 | 0 | 0 | 0 | 0 |
| Component (K); | | | | | |
| (K-1) Calcium silicate fiber | 5 | 5 | 5 | 5 | 5 |
| Results of Evaluation | | | | | |
| Surface Resistivity value (Ω/sq.) | $10^{14}$-$10^{15}$ | $10^{14}$-$10^{15}$ | $10^{10}$-$10^{11}$ | $10^{14}$-$10^{15}$ | $10^{8}$-$10^{9}$ |
| Bleeding-out | ◉ | ◉ | Δ | ◉ | Δ |

Antistatic Durability

Surfaces of the test pieces of Examples 107 to 125 were wiped 20 times with a cloth impregnated with a domestic detergent, and after drying with a hair dryer, the surface resistivity value was measured again. As a result, it was confirmed that all showed excellent durability of $10^8$ to $10^9$ Ω/sq.

From the above tables, the rubber compositions of Examples of the present invention were all thermally stable, and had no problems of the bleeding-out and the like, while maintaining excellent antistatic properties. On the other hand, in Comparative Examples of the above tables, when the antistatic agent of the present invention was not added, the antistatic properties were poor, and when the conventional antistatic agent was added, the bleeding-out occurred.

As explained above, according to the present invention, the antistatic composition can be obtained in which the bleeding-out of an electric conductive substance is little, and whose antistatic property and formability are good, method for producing thereof and processed product thereof.

INDUSTRIAL APPLICABILITY

In the compositions of the present invention, the bleeding-out of electric conductive substances is little, and whose antistatic property and formability are good. Further, the antistatic compositions of the present invention can be suitably used for antistatic measure applications requiring high antistatic properties, for example, such as electronic equipment parts, manufacturing machines of electronic materials, business equipment parts, the OA field, the home electric appliance field, automobile parts, building materials, floor materials, tires, tubes, hoses, packaging films, packaging materials, covering applications such as sealing materials, particularly covering of casters used in hospitals, clean rooms and the like, gloves and synthetic leathers.

The invention claimed is:

1. An antistatic composition containing
    (A) a thermoplastic resin,
    (J) polyether segment-containing antistatic elastomers, and
    (B) at least one lithium salt selected from the group consisting of lithium bis(trifluoro-methanesulfonyl)imide and lithium tris(trifluoromethanesulfonyl)methide,
    wherein the amount of component (B) is from 0.003 to 12.5 parts by weight based on 100 parts by weight of component (A) and (J), and
    wherein said component (J) is contained in an amount of 20 to 5 parts by weight based on 80 to 95 parts by weight of said thermoplastic resin (A) (provided (A)+(J)=100 parts by weight),
    said antistatic composition being prepared by mixing components (A), (J), and (B) together at the same time or by mixing components (J) and (B) together and then mixing component (A) with the resulting mixture.

2. The antistatic composition according to claim 1, wherein said component (A) is at least one selected from the group consisting of polystyrenic resins, polyamide and aliphatic polyesters.

3. The antistatic composition according to claim 1, which is a pelletized composition obtained by melt kneading constituent components.

4. The antistatic composition according to claim 1, which is a directly formable composition obtained by dry blending constituent components.

5. An antistatic composition containing
    (L) at least one polymer selected from the group consisting of natural rubber, styrene-butadiene rubber (SBR), isoprene rubber, ethylene-propylene rubber, an ethylene-propylene-diene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber,
    (J) polyether segment-containing antistatic elastomers, and
    (B) at least one lithium salt selected from the group consisting of lithium bis(trifluoromethanesulfonyl)imide and lithium tris(trifluoromethanesulfonyl)methide,
    wherein the amount of component (B) is from 0.001 to 3.0 parts by weight based on 100 parts by weight of component (L) and (J), and
    wherein said component (J) is contained in an amount of 20 to 5 parts by weight based on 80 to 95 parts by weight of said thermoplastic resin (L) (provided (L)+(J)=100 parts by weight),
    said antistatic composition being prepared by mixing components (L), (J), and (B) together at the same time or by mixing components (J) and (B) together and then mixing component (L) with the resulting mixture.

6. The antistatic composition according to claim 5, which is a pelletized composition obtained by melt kneading constituent components.

7. The antistatic composition according to claim 5, which is a directly formable composition obtained by dry blending constituent components.

8. A process for producing an antistatic composition containing (A) a thermoplastic resin, (J) polyether segment-containing antistatic elastomers, and (B) at least one lithium salt selected from the group consisting of lithium bis(trifluoromethanesulfonyl)imide and lithium tris(trifluoromethanesulfonyl)methide, wherein the amount of component (B) is from 0.003 to 12.5 parts by weight based on 100 parts by weight of component (A) and (J), and wherein said component (J) is contained in an amount of 20 to 5 parts by weight based on 80 to 95 parts by weight of said thermoplastic resin (A) (provided (A)+(J)=100 parts by weight), said process comprising a step of mixing components (A), (J), and (B) together at the same time or mixing components (J) and (B) together and then mixing component (A) with the resulting mixture.

9. The process according to claim 8, wherein said component (A) is at least one selected from the group consisting of polystyrenic resins, polyamide and aliphatic polyesters.

10. The process according to claim 8, which is a pelletized composition obtained by melt kneading constituent components.

11. The process according to claim 8, which is a directly formable composition obtained by dry blending constituent components.

12. A process for producing an antistatic composition containing (L) at least one polymer selected from the group consisting of natural rubber, styrene-butadiene rubber (SBR), isoprene rubber, ethylene-propylene rubber, an ethylene-propylene-diene monomer copolymer (EPDM), acrylonitrile-butadiene rubber (NBR), chloroprene rubber, epichlorohydrin rubber, a styrene-butadiene block copolymer, butyl rubber, fluorine rubber, silicone rubber and urethane rubber, (J) polyether segment-containing antistatic elastomers, and (B) at least one lithium salt selected from the group consisting of lithium bis(trifluoromethanesulfonyl)imide and lithium tris(trifluoromethanesulfonyl)methide, wherein the amount of component (B) is from 0.001 to 3.0 parts by weight based on 100 parts by weight of component (L) and (J), and wherein said component (J) is contained in an amount of 20 to 5 parts by weight based on 80 to 95 parts by weight of said thermoplastic resin (L) (provided (L)+(J)=100 parts by weight), said process comprising a step of mixing components (L), (J), and (B) together at the same time or mixing components (J) and (B) together and then mixing component (L) with the resulting mixture.

* * * * *